United States Patent [19]
Abbott et al.

[11] Patent Number: 5,381,359
[45] Date of Patent: Jan. 10, 1995

[54] ADAPTATION AND TRAINING OF DIGITAL FINITE IMPULSE RESPONSE FILTER WITHIN PRML SAMPLING DATA DETECTION CHANNEL

[75] Inventors: William L. Abbott, Portola Valley; Hung C. Nguyen, San Jose, both of Calif.

[73] Assignee: Quantum Corporation, Milpitas, Calif.

[21] Appl. No.: 936,761

[22] Filed: Aug. 27, 1992

[51] Int. Cl.$^6$ .......................... G06F 7/38; H03H 7/30
[52] U.S. Cl. ............................... 364/724.19; 375/14; 375/18; 360/40
[58] Field of Search ..................... 371/43; 364/724.01, 364/724.16, 724.29, 746.1; 340/146.2; 360/39, 40, 41, 42, 43, 44, 46, 49; 369/59; 375/18

[56] References Cited

U.S. PATENT DOCUMENTS

| | | | |
|---|---|---|---|
| 4,504,872 | 3/1985 | Peterson | 360/40 |
| 4,644,564 | 2/1987 | Dolivo et al. | 375/18 |
| 4,754,419 | 6/1988 | Iwata | 364/724.19 |
| 4,847,871 | 7/1989 | Matsushita et al. | 375/94 |
| 5,132,988 | 7/1992 | Fisher et al. | 375/14 |
| 5,142,551 | 8/1992 | Borth et al. | 371/43 |
| 5,150,379 | 9/1992 | Baugh et al. | 375/14 |

OTHER PUBLICATIONS

Wood, Petersen, "Viterbi Detection of Class IV Partial Response on a Magnetic Recording Channel," *IEEE Trans. on Communications*, vol. COM-34 No. 5 May 1986, pp. 454–461.

Schmerbeck, Richetta, Smith, "A 27 MHz Mixed Analog/Digital Magnetic Recording Channel DSP Using Partial Response Signalling with Maximum Likelihood Detection" *Proc. 1991 IEEE Int'l Solid State Circuits Conf.* pp. 136–137, 304, and pp. 96, 97, 256 Slide Supplement.

Wood, Ahlgrim, Hallamasek and Swenson, "An Experimental Eight–Inch Disc Drive with 100 Megabytes per Surface", *IEEE Trans. on Magnetics*, vol. MAG-20, No. 5, Sep. 1984, pp. 698–702.

Kobayashi, Tang, "Application of Partial–Response Channel Coding to Magnetic Recording Systems," *IBM Journal of Research and Develop.*, Jul. 1970 pp. 368–375.

Kobayashi, "Application of Probabilistic Decoding to Digital Magnetic Recording Systems" *IBM Journal of Research and Develop.* Jan. 1971, pp. 64–74.

Dolivo, "Signal Processing of High–Density Digital Magnetic Recording" *Proc. 1989 IEEE VLSI and Computer Peripherals*, Hamburg, West Germany, May 1989 pp. 1–91 to 1–96.

Coker, Galbraith, Kerwin, Rae, Ziperovich, "Implementation of PRML in a Rigid Disk Drive" *IEEE Transactions on Magnetics*, vol. 27, No. 6, Nov. 1991.

Cideciyan, Dolivo, Hermann, Hirt, Schott, "A PRML System for Digital Magnetics Recording" *IEEE Journal on Selected Areas of Communication*, Vol. 10, No. 1, Jan. 1992, pp. 38–56.

Abbott, Bednarz, Fisher, Cioffi, "A High–Speed Adaptive Equalizer for Magnetic Disk Drives", *Proc. IEEE ICASSP*, Albuquerque, N.M., Apr. 1990, pp. 929–932.

*Primary Examiner*—Roy N. Envall, Jr.
*Assistant Examiner*—Emmanuel Moise
*Attorney, Agent, or Firm*—David B. Harrison

[57] ABSTRACT

A digital adaptive finite impulse response filter circuit is provided for a PR4,ML sampled data channel including an analog to digital sampler for providing raw digital samples of data to the filter circuit and a sampled data detector for detecting coded data from conditioned digital samples received from the filter circuit. The filter circuit comprises a multi-tap transversal filter structure wherein each tap is connected to receive a selected coefficient, a source of a plurality of coefficients for each tap, a coefficient selector connected to the source to receive the plurality of coefficients and to provide a selected coefficient to each tap of the transversal filter structure, and a control circuit for controlling the coefficient selector and the source for providing each of the selected coefficients to a corresponding tap of the transversal filter structure. Training and adaptation methods and circuits for adapting the filter structure are also described.

13 Claims, 13 Drawing Sheets

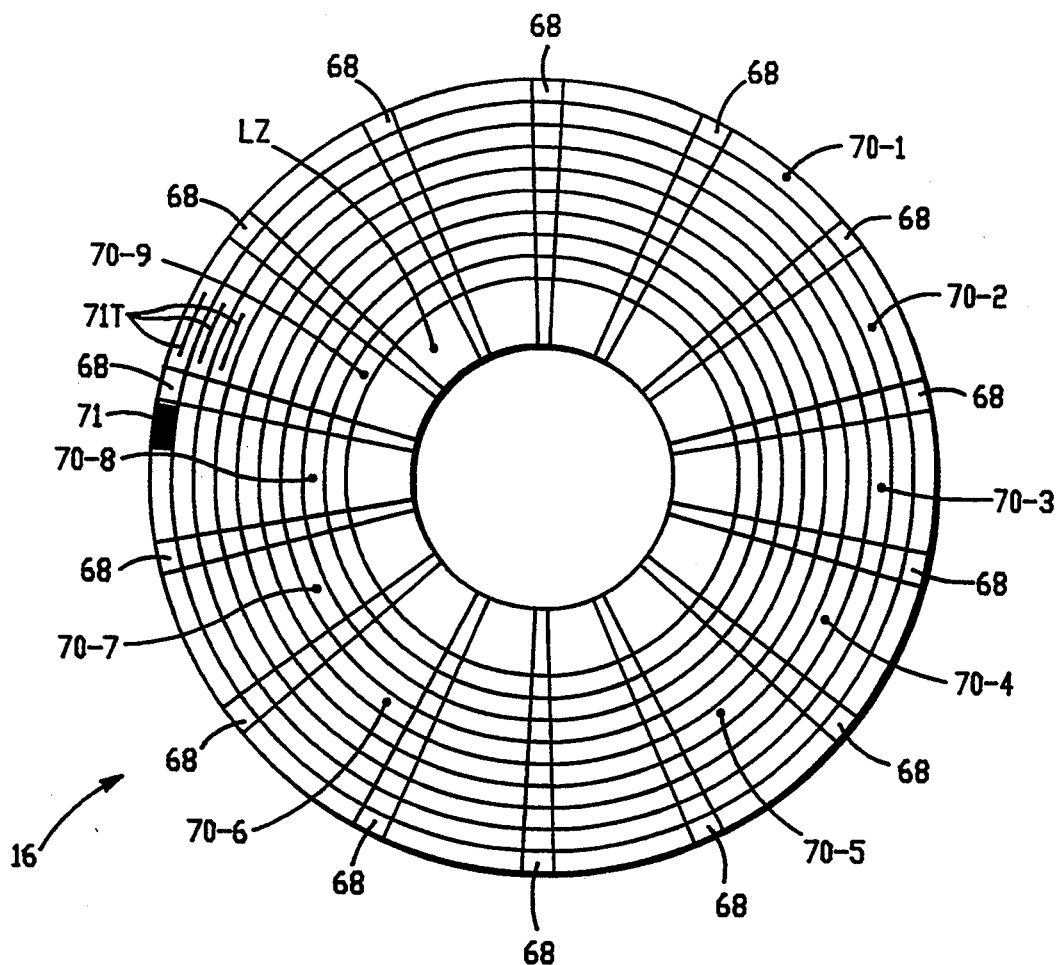
FIG.-5
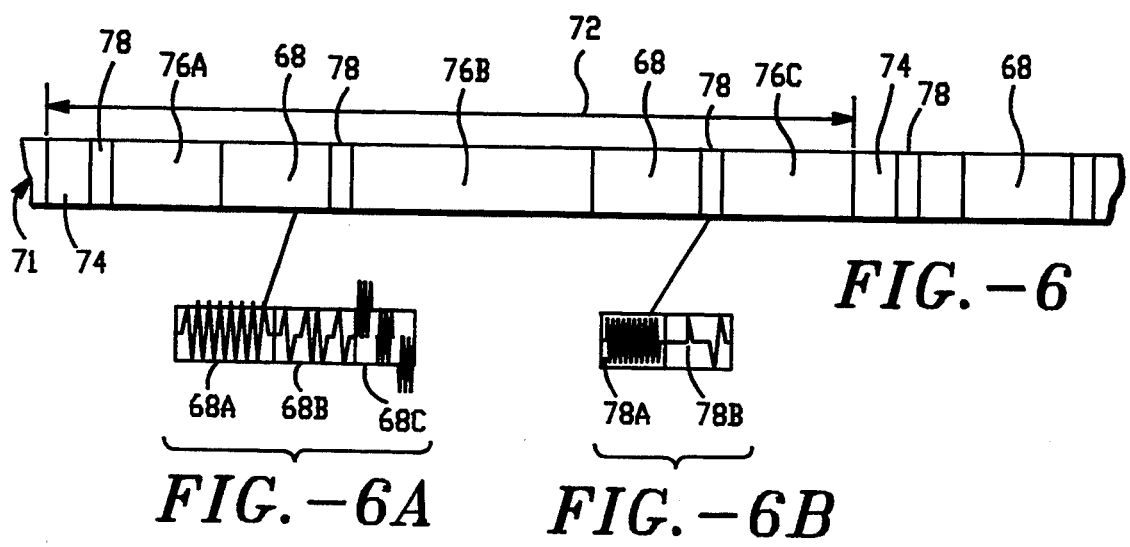
FIG.-6
FIG.-6A    FIG.-6B

ADAPTATION AND TRAINING OF DIGITAL FINITE IMPULSE RESPONSE FILTER WITHIN PRML SAMPLING DATA DETECTION CHANNEL CHANNEL

REFERENCE TO RELATED APPLICATION

The present invention is related to U.S. patent application Ser. No. 07/937,064 filed on the same date as the application resulting in this patent and entitled DISK DRIVE USING PRML CLASS IV SAMPLING DATA DETECTION WITH DIGITAL ADAPTIVE EQUALIZATION, now U.S. Pat. No. 5,341,249 the disclosure of which is hereby incorporated herein by reference.

FIELD OF THE INVENTION

The present invention relates to data transfer and storage methods and apparatus employing 8/9the coding and synchronized, partial response, maximum likelihood ("PRML") detection. More particularly, the present invention relates to methods and apparatus for adapting and training of a digital finite impulse response ("FIR") filter for equalizing a partial response, class IV, maximum likelihood (hereinafter referred to as "PR4,ML") data channel.

BACKGROUND OF THE INVENTION

Conventional disk drives have employed peak detection techniques in order to recover digital data written as saturation recording onto a magnetizable surface media of a rotating disk. With peak detection techniques, it is necessary to space flux transitions sufficiently apart so that analog peaks in the recovered data stream may be identified and the corresponding data recovered. In order to achieve reasonable bandwidths in data channels, it has been customary to employ data coding techniques. One such technique has been to use a (1,7) RLL code. In this code, flux transitions can be no closer together than every other clock bit time period ("bit cell") nor farther apart than eight clock bit cells. (1,7) RLL codes are known as "rate two-thirds" codes, in the sense that two data bits are coded into three code bits. Thus, with a rate two-thirds code, one third of the user storage area of the storage disk is required for code overhead.

One way to decrease the code overhead is to employ a code in which flux transitions are permitted in adjacent bit cells. One such code is a (0,4,4) code. The (0,4,4) code is generally thought of as a rate eight-ninths code, meaning that nine code bits are required for eight incoming data bits. (Theoretically, the (0,4,4) code ratio is somewhat higher, approaching 0.961) Thus, this code is significantly more efficient than a rate two-thirds code, such as (1,7) RLL. Use of a (0,4,4) code results in a significantly greater net user data storage capacity on the disk surface, given a constant bit cell rate. However, when flux transitions occur in adjacent bit cells, as is the case with a (0,4,4) code, intersymbol interference ("ISI") results. Conventional peak detection techniques are not effective or reliable in recovering data coded in an eight-ninths code format, such as (0,4,4).

The zero in the (0,4,4) code denotes that flux transitions may occur in directly adjacent bit cells of the coded serial data stream. The first "4" denotes that a span of no more than four zeros occurs between ones in the encoder output. The second "4" signifies that the bit cell stream has been divided into two interleaves: an even interleave, and an odd interleave; and, it denotes that there can be a span of no more than four zeros between ones in the encoder output of either the odd interleave or the even interleave.

It is known that partial response signalling enables improved handling of ISI and allows more efficient use of the bandwidth of a given channel. Since the nature of ISI is known in these systems, it may be taken into account in the decoding/detection process. Partial response transmission of data lends itself to synchronous sampling and provides an elegant compromise between error probability and the available spectrum. The partial response systems described by the polynomials $1+D$, $1-D$, and $1-D^2$ are known as duobinary, dicode and class IV (or "PR4"), respectively, where D represents one bit cell delay and $D^2$ represents 2 bit cell delays (and further where $D=e^{-j\omega T}$, where $\omega$ is a frequency variable in radians per second and T is the sampling time interval in seconds). The PR4 magnitude response plotted in FIG. 1 hereof and given the notation $|1-D^2|$ emphasizes midband frequencies and results in a read channel with increased immunity to noise and distortion at both low and high frequencies. In magnetic recording PR4 is a presently preferred partial response system, since there is a close correlation between the idealized PR4 spectrum as graphed in FIG. 1, and the natural characteristics of a magnetic data write/read channel.

In order to detect user data from a stream of coded data, not only must the channel be shaped to a desired partial response characteristic, such as the PR4 characteristic, but also a maximum likelihood ("ML") sequence estimation technique is needed. The maximum likelihood sequence estimation technique determines the data based upon an analysis of a number of consecutive data samples taken from the coded serial data stream, and not just one peak point as was the case with the prior peak detection methods.

One maximum likelihood sequence estimation algorithm is known as the Viterbi detection algorithm, and it is well described in the technical literature. Application of the Viterbi algorithm to PR4 data streams within a magnetic recording channel is known to improve detection of original symbol sequences in the presence of ISI and also to improve signal to noise ratio over comparable peak detection techniques.

In an article entitled "Viterbi Detection of Class IV Partial Response on a Magnetic Recording Channel" appearing in *IEEE Trans. on Communications.* vol. Com-34, No. 5, May, 1986, pp. 434–461, authors Wood and Peterson explain the derivation of PR4 as being formed by subtracting waveforms two bit intervals apart, thereby forming an analog domain ternary "eye" pattern graphed herein in FIG. 2.

The Viterbi algorithm provides an iterative method of determining the "best" route along the branches of a trellis diagram, such as the one shown in FIG. 3 hereof, for example. If, for each trellis branch, a metric is calculated which corresponds to the logarithm of the probability for that branch, then the Viterbi algorithm may be employed to determine the path along the trellis which accumulates the highest log probability, i.e., the "maximum likelihood" sequence. Since the Viterbi algorithm operates upon a sequence of discrete samples $\{Y_k\}$, the read signal is necessarily filtered, sampled, and equalized.

While PRML has been employed in communications signalling for many years, it has only recently been applied commercially within magnetic hard disk drives. One recent application is described in a paper by Schmerbeck, Richetta, and Smith, entitled "A 27 MHz Mixed Analog/Digital Magnetic Recording Channel DSP Using Partial Response Signalling with Maximum Likelihood Detection", Proc. 1991 *IEEE International Solid State Circuits Conference,* pp. 136-137, 304, and pp. 96, 97 and 265 Slide Supplement. While the design reported by Schmerbeck et al. appears to have worked satisfactorily, it has drawbacks and limitations which are overcome by the present invention. One drawback of the reported approach was its design for transducers of the ferrite MiG type or of the magnetoresistive type which simplified channel equalization requirements. Another drawback was the use of a single data transfer rate which significantly simplified channel architecture. A further drawback was the use of a dedicated servo surface for head positioning within the disk drive, thereby freeing the PR4, ML data channel from any need for handling of embedded servo information or for rapid resynchronization to the coded data stream following each embedded servo sector.

Prior Viterbi detector architectures and approaches applicable to processing of data sample sequences taken from a communications channel or from a recording device are also described in the Dolivo et al. U.S. Pat. No. 4,644,564. U.S. Pat. No. 4,504,872 to Peterson describes a digital maximum likelihood detector for class IV partial response signalling. An article by Roger W. Wood and David A. Peterson, entitled: "Viterbi Detection of Class IV Partial Response on a Magnetic Recording Channel" *IEEE Trans, on Comm.* Vol. Com-34, No. 5, May, 1986, pp. 454-466 describes application of Viterbi detection techniques to a class IV partial response in a magnetic recording channel. An article by Roger Wood, Steve Ahigrim, Kurt Hallarnasek and Roger Stenerson entitled: "An Experimental Eight-Inch Disc Drive with One-Hundred Megabytes per Surface", *IEEE Trans. on Magnetics,* Vol. Mag-20, No. 5, September, 1984, pp 698-702 describes application of class IV partial response encoding and Viterbi detection techniques as applied within an experimental disk drive. A digital Viterbi detector capable of withstanding lower signal to noise ratios is described in Matsushita et al. U.S. Pat. No. 4,847,871. These documents are representative examples of the known state of the prior art.

It is known that equalization is an important part of any PR4,ML data channel. Without proper shaping, the digital samples entering the Viterbi detector will not occur at three distinct levels and produce the desired open eye pattern, FIG. 2. Ideally, a PR4,ML channel equalizer will provide for band limiting beyond the Nyquist frequency, will provide for magnitude adjustment and will provide for phase compensation. While recognized as needed, the equalization task is made more difficult when zoned data recording techniques, and embedded servo techniques are employed within a disk drive PR4,ML data channel.

One proposed solution is discussed for example in an article by J. D. Coker, R. L. Galbraith, G. J. Kerwin, J. W. Rae and P. A. Ziperovich entitled "Implementation of PRML in a Rigid Disk Drive" *IEEE Trans. on Magnetics,* Vol. 27, No. 6, November, 1991, pp. 4538-4543. The data channel described in that article included a three-tap FIR feed forward filter using a single K adjustment parameter. The center tap weight multiplier in the filter was maintained at unity while the two remaining tap weight multipliers were specified by a common K value. The transfer function of the filter was defined by: $H(f)=1+2K\cos(2\pi fT)$. This transfer function provided only magnitude adjustment and did not modify the phase of the signal except for fixed group delay errors. The Coker et al. approach was intended to compensate for differences in characteristics from the inside disk diameter to the outside diameter. A five-byte training sequence, written as part of each sector header format, was used to train the three tap FIR filter to an optimized response for the user data of the particular data sector. A logic algorithm function operating at the output of the FIR filter was used to generate a $\Delta K$ error term. The $\Delta K$ error term was digitally integrated to derive the K value which was used to adjust the transfer function of the FIR filter.

While the foregoing approach provided for some adaptivity and training for an FIR filter, it did so in an operating environment not including reconfiguration for embedded sector servo information written at a different data transfer rate than the user data, and also not including zone-data-recording techniques. Thus, a hitherto unsolved need has arisen for an improved FIR filter for adaptive equalization of a PR4,ML data channel, and for an improved filter training method for the FIR filter.

SUMMARY OF THE INVENTION

A general object of the present invention is to provide methods for rapidly adapting data channel response within a PR4,ML disk drive data channel in a drive architecture including embedded servo sectors, and zoned data recording techniques, and in a manner which overcomes limitations and drawbacks of the prior art.

A more specific object of the present invention is to provide a PR4, ML channel within a disk drive which includes a highly programmable analog section and a highly programmable and adaptive digital section including an adaptive digital equalizer in order to adapt to particular hardware tolerances and data channel conditions of the disk drive.

One more object of the present invention is to provide an adaptive equalizer including a digital finite impulse response ("FIR") filter within a PR4, ML disk drive data channel.

Yet one more object of the present invention is to provide a filter coefficient adaptation circuit for adapting an FIR filter within a PR4, ML disk drive data channel.

A related object of the present invention is to provide a digital FIR filter and a digital filter coefficient adaptation circuit for adapting the digital FIR filter to a desired particular response of a PR4,ML disk drive data channel.

Yet another related object of the present invention is to provide a filter training method for adapting the characteristics of an FIR filter with a filter coefficient adaptation circuit within a PR4, ML disk drive data channel, by using the sign of a sync pattern in combination with a pseudo-random sequence of data values otherwise present for data error correction purposes.

A further object of the present invention is to provide a method for training a digital FIR filter to achieve a desired particular response within a PR4,ML disk drive data channel, particularly, but not necessarily, one employing zoned data recording techniques.

Yet one more object of the present invention is to provide a digital FIR filter architecture which enables on-the-fly adaptation of the filter coefficients from user data samples in a decision-directed operating mode.

Yet another object of the present invention is to provide a digital FIR filter architecture which may be rapidly reprogrammed in one clock cycle in order to facilitate detection of embedded sector head position servo information written at a different frequency than the user data samples.

In accordance with principles of the present invention, a digital adaptive finite impulse response filter circuit is provided for a PR4,ML sampled data channel including an analog to digital sampler for providing raw digital samples of data to the filter circuit and a sampled data detector for detecting coded data from conditioned digital samples received from the filter circuit. The filter circuit comprises a multi-tap transversal filter structure wherein each tap is connected to receive a selected coefficient, a source of a plurality of coefficients for each tap, a coefficient selector connected to the source to receive the plurality of coefficients and to provide a selected coefficient to each tap of the transversal filter structure, and a control circuit for controlling the coefficient selector and the source for providing each of the selected coefficients to a corresponding tap of the transversal filter structure. Training and adaptation methods and circuits for adapting the filter coefficients form important aspects and features of the present invention.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 5 is a simplified diagram of a recording pattern formed on a data storage surface of the FIG. 4 disk drive, illustrating data zones and embedded servo sector patterns.

FIG. 6 is an enlarged lineal depiction of a segment of one data track within the multiplicity of data tracks defined within the FIG. 5 data layout plan, illustrating one data field which has been split into segments by regularly occurring embedded servo sectors.

FIG. 6A is an enlarged diagrammatic representation of flux transitions comprising one of the embedded servo sectors of the FIG. 6 lineal data track segment depiction.

FIG. 6B is an enlarged diagrammatic representation of flux transitions comprising one of the data ID headers of the FIG. 6 lineal data track segment depiction.

In the electrical block diagrams briefly described above, various vertical boxes containing hatching sometimes appear. In some but not all instances, these boxes are described in the following text. In all cases, these boxes represent clock cycle delay registers. Thus, by counting the number of vertical hatched boxes within a particular block or path, the reader will determine the number of clock cycle delays.

SYSTEM OVERVIEW

Figure 4:
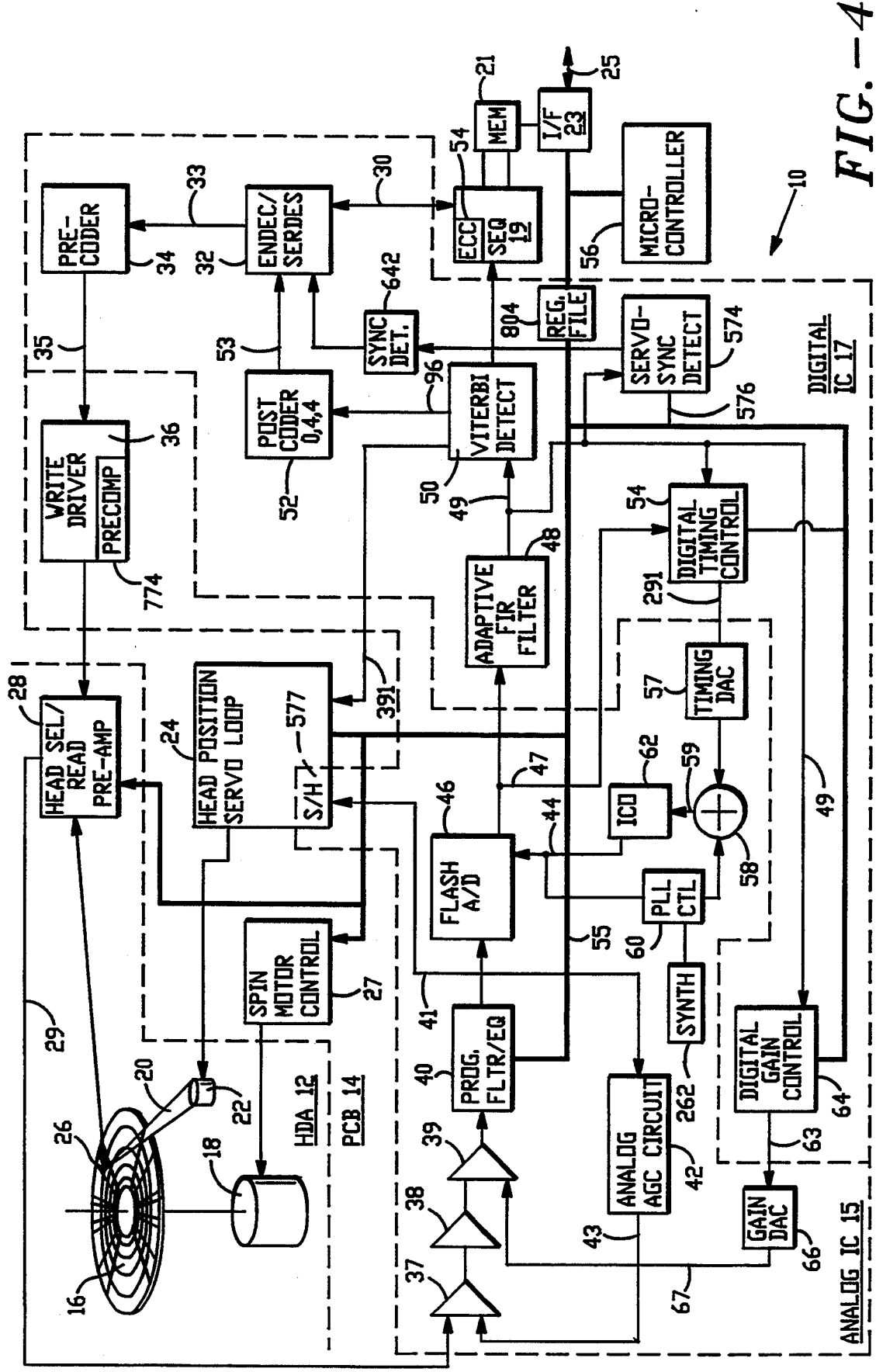
FIG. 4 is a simplified overall system block diagram of a disk drive including a PR4, ML write/read channel architecture incorporating principles and aspects of the present invention.

With reference to FIG. 4, an exemplary high performance, high data capacity, low cost disk drive 10 incorporating a programmable and adaptive PR4,ML write/read channel in accordance with the principles of the present invention includes e.g. a head and disk assembly ("HDA") 12 and at least one electronics circuit board (PCB) 14. The HDA 12 may follow a wide variety of embodiments and sizes. One example of a suitable HDA is given in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned, copending U.S. patent application Ser. No. 07/881,678, filed on May 12, 1992, and entitled "Hard Disk Drive Architecture". The disclosures of these patents and this application are incorporated herein by reference thereto.

The electronics PCB 14 physically supports and electrically connects the circuitry for an intelligent interface disk drive subsystem, such as the drive 10. The electronics circuitry contained on the PCB 14 includes an analog PR4, ML read/write channel application-specific integrated circuit (ASIC) 15, a digital PR4, ML read/write channel ASIC 17, a data sequencer and cache buffer controller 19, a cache buffer memory array 21, a high level interface controller 23 implementing a bus level interface structure, such as SCSI II target, for communications over a bus 25 with a SCSI II host initiator adapter within a host computing machine (not shown). A micro-controller 56 includes a micro-bus control structure 55 for controlling operations of the sequencer 19, interface 23, a servo loop 24, a spindle motor controller 27, a programmable analog filter/equalizer 40, adaptive FIR filter 48, Viterbi detector 50, and a digital timing control 54 as well as a digital gain control 64. The micro-controller 56 is provided with direct access to the DRAM memory 21 via the sequencer/memory controller 19 and may also include onboard and outboard read only program memory, as may be required or desired.

The printed circuit board 14 also carries circuitry related to the head positioner servo 24 including e.g. a separate microprogrammed digital signal processor (DSP) for controlling head position based upon detected actual head position information supplied by a servo peak detection portion of the PR4,ML read channel and desired head position supplied by the microcontroller 56. The spindle motor control circuitry 27 is provided for controlling the disk spindle motor 18 which rotates the disk or disks 16 at a desired angular velocity.

The HDA 12 includes at least one data storage disk 16. The disk 16 is rotated at a predetermined constant angular velocity by a speed-regulated spindle motor 18 controlled by spindle motor control/driver circuitry 27. An e.g. in-line data transducer head stack assembly 20 is positioned e.g. by a rotary voice coil actuator 22 which is controlled by the head position servo loop circuitry 24. As is conventional, a data transducer head 26 of the head stack assembly 20 is associated in a "flying" relationship over a disk surface of each disk 16. The head stack assembly 20 thus positions e.g. thin film data transducer heads 26 relative to selected ones of a multiplicity of concentric data storage tracks 71 defined on each storage surface of the rotating disk 16. While thin film heads are presently preferred, improvements in disk drive performance are also realized when other types of heads are employed in the disclosed PR4, ML data channel, such as MiG heads or magneto-resistive heads, for example.

The heads 16 are positioned in unison with each movement of the actuator and head stack assembly 20, and the resulting vertically aligned, circular data track locations are frequently referred to as "cylinders" in the disk drive art. The storage disk may be an aluminum alloy or glass disk which has been e.g. sputter-deposited with a suitable multi-layer magnetic thin film and a protecting carbon overcoat in conventional fashion, for example. Other disks and magnetic media may be employed, including plated media and or spin-coated oxide media, as has been conventional in drives having lower data storage capacities and prime costs.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14. Alternatively, and equally preferably, the preamplifier 28 may be connected to the other circuitry illustrated in FIG. 4 exteriorly of the HDA 12 in an arrangement as described in the referenced copending U.S. patent application Ser. No. 07/881,678, filed on May 12, 1992, and entitled "Hard Disk Drive Architecture".

A bidirectional user data path 30 connects the digital integrated circuit 17 with the data sequencer and memory controller 19. The data path 30 from the sequencer 19 enters an encoder/decoder ("ENDEC") 32 which also functions as a serializer/deserializer ("SERDES"). In this preferred embodiment, the ENDEC 32 converts the binary digital byte stream into coded data sequences in accordance with a predetermined data coding format, such as (0,4,4) code. This coded serial data stream is then delivered over a path 33 to a precoder 34 which precodes the data in accordance with the PR4 precoding algorithm $1/(1 \oplus D^2)$. The precoded data is then passed over a path 35 to a write driver circuit 36 within the analog IC 15 wherein it is amplified and precompensated by a write precompensation circuit 774 and is then delivered via a head select function within the circuit 28 to the selected data transducer head 26. The head 26 writes the data as a pattern of alternating flux transitions within a selected data track 71 of a block 72 of data tracks defined on a selected data storage surface of the disk 16, see FIGS. 5 and 6. Embedded servo patterns are written by a servo writer, preferably in accordance with the methods described in a commonly assigned U.S. patent application Ser. No. 07/569,065 filed on Aug. 17, 1990, entitled "Edge Servo For Disk Drive Head positioner, now U.S. Pat. No. 5,170,299, the disclosure thereof being hereby incorporated by reference.

Returning to FIG. 4, during playback, flux transitions sensed by the e.g. thin film data transducer head 26 as it flies in close proximity over the selected data track 71 are preamplified by the read preamplifier circuit 28. The preamplified analog signal (or "read signal") is then sent to the analog IC 15 on a path 29 and into an analog variable gain amplifier (VGA) 37, a fixed gain amplifier 38, and a second VGA 39. After controlled amplification, the read signal is then passed through a programmable analog filter/equalizer stage 40. During non-read times, an analog automatic gain control circuit 42 feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant.

The analog filter/equalizer 40 is programmed so that it is optimized for the data transfer rate of the selected data zone 70 from within which the transducer head 26 is reading data. The equalized analog read signal is then subjected to sampling and quantization within a high speed flash analog to digital (A/D) converter 46 which, when synchronized to user data, generates raw data samples $\{x_k\}$.

Figure 1:
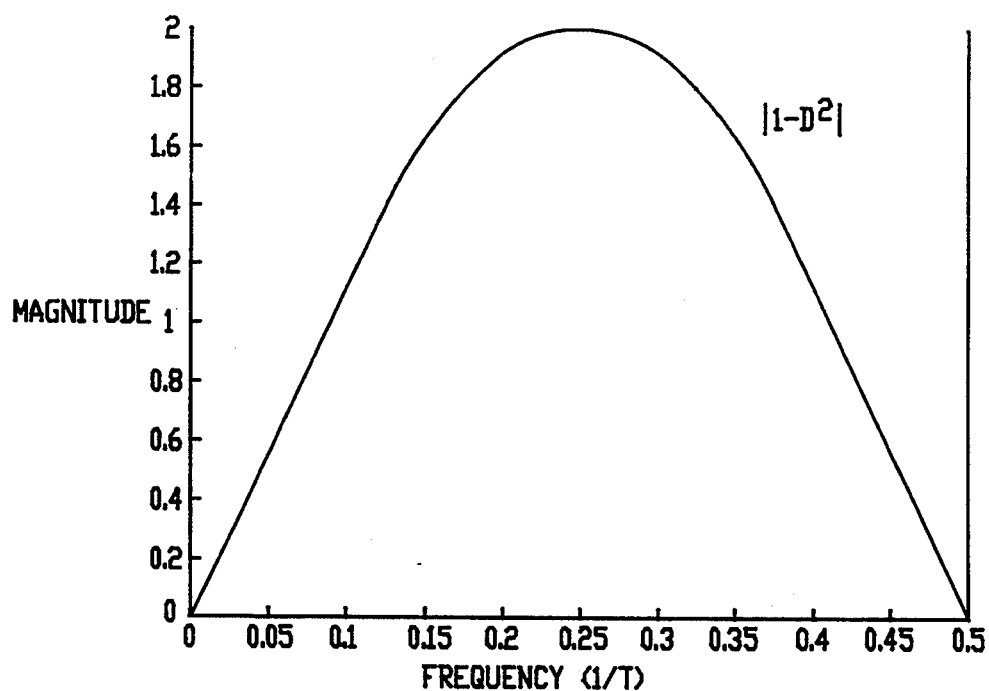
FIG. 1 is a graph of an idealized PR4 channel magnitude response spectrum.
Figure 2:
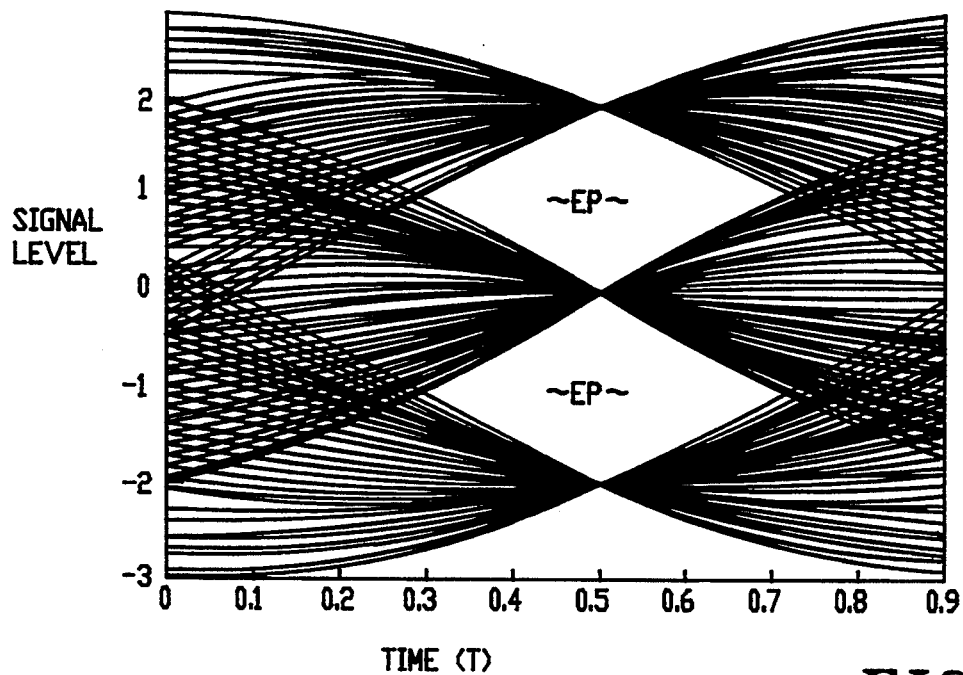
FIG. 2 is an exemplary ternary or "eye" diagram illustrating detection of signal levels in a PR4 channel.
Figure 3:
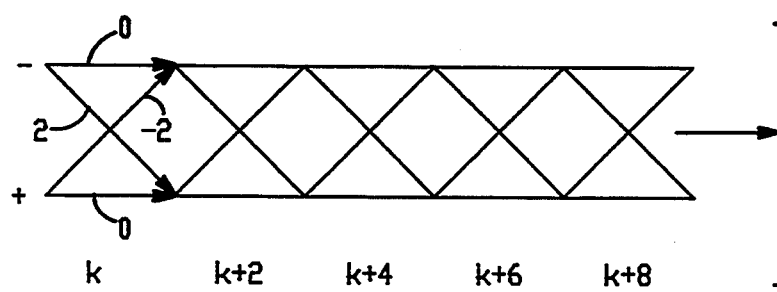
FIG. 3 is a trellis diagram employed by a Viterbi detector in detecting a maximum likelihood data sequence occurring within one interleave of a PR4 data stream.

The FIR filter 48 employs adaptive filter coefficients for filtering and conditioning the raw data samples $\{x_k\}$ in accordance with the desired PR4 channel response characteristics, as plotted in FIG. 1, in order to produce filtered and conditioned samples $\{Y_k\}$. The bandpass filtered and conditioned data samples $\{Y_k\}$ leaving the filter 48 are then passed over a path 49 to the Viterbi detector 50 which detects the data stream, based upon the Viterbi maximum likelihood algorithm employing a lattice pipeline structure implementing a trellis state decoder of the type illustrated in FIG. 3, for example. At this stage, the decoded data put out on a path 96 is in accordance with a (0,6,5) coding convention. A postcoder 52 receives the (0,6,5) coded data stream and restores the original (0,4,4) coding convention to the decoded data. The restored (0,4,4) coded data stream is decoded from the (0,4,4) code and deserialized by the ENDEC/SERDES 32 which frames and puts out eight bit user bytes which then pass into the sequencer 19 over the data path 30.

In order for the present system to work properly, the raw data samples $\{x_k\}$ must be taken on the incoming analog signal waveform at precisely proper, regular locations. A dual mode timing loop is provided to control the frequency and phase of the flash analog to digital converter 46. The timing loop includes an analog timing control circuit 60, and a digital timing control circuit 54 and a timing DAC 57. A timing phase locked synthesizer circuit 262 supplies synthesized timing signals to the control circuit 60 and a timing reference signal to a summing junction 58. A sum put out by the summing junction 58 controls a current controlled oscillator 62 in order to clock the A/D 46. The oscillator 62 also includes zero phase start circuitry to provide controlled startup at an approximately correct phase with the incoming data samples.

In order to achieve full utilization of the flash A/D 46, a dual mode gain loop is also provided. The gain loop includes the analog gain control circuit 42 which controls the first VGA 37, and a digital gain control circuit 64 and the gain DAC 66 which controls the second VGA 39.

DATA RECORDING PATTERN

As shown in FIG. 5, an exemplary data storage surface of a storage disk 16 comprises a multiplicity of concentric data tracks 71 which are preferably arranged in a plurality of data recording zones 70 between an inner landing zone area LZ and a radially outermost peripheral data track zone 70-1. In the illustrated example, the data tracks are shown as arranged into e.g. nine data zones including the outermost zone 70-1, and radially inward zones 70-2, 70-3, 70-4, 70-5, 70-6, 70-7, 70-8 and 70-9, for example. In practice, more zones, such as 16 zones, are presently preferred. Each data zone has a bit transfer rate selected to optimize areal transition domain densities for the particular radius of the zone. Since the number of available magnetic storage domains varies directly as a function of disk radius, the tracks of the outermost zone 70-1 will be expected to contain considerably more user data than can be contained in the tracks located at the innermost zone 70-9. The number of data fields, and the data flux change rate will remain the same within each data zone, and will be selected as a function of radial displacement from the axis of rotation of the storage disk 16.

FIG. 5 also depicts a series of radially extending embedded servo sectors 68 which e.g. are equally spaced around the circumference of the disk 16. As shown in FIG. 6, each servo sector includes a servo preamble field 68A, a servo identification field 68B and a field 68C of circumferentially staggered, radially offset, constant frequency servo bursts, for example. In addition to data fields 76 which store user data information and error correction code syndrome remainder values, for example, each data track has certain overhead information such as the FIG. 6 data block header fields 74, and data block ID fields 78. While the number of data sectors per track varies from data zone to data zone, in the present example, the number of embedded servo sectors 68 per track remains constant throughout the surface area of the disk 16. In this present example the servo sectors 68 extend radially and are circumferentially equally spaced apart throughout the extent of the storage surface of the disk 16 so that the data transducer head 26 samples the embedded servo sectors 68 while reading any of the concentric tracks defined on the data storage surface. Also, the information recorded in the servo ID field 68B of each servo sector 68 is e.g. prerecorded with servowriting apparatus at the factory at a predetermined relative low constant frequency, so that the servo information will be reliable at the innermost track location, e.g. within the innermost zone 70-9. While regular servo sectors are presently preferred, a pattern of servo sectors aligned with data sectors and therefore unique within each data zone 70 is also within the contemplation of the present invention. Such a pattern is illustrated in U.S. Pat. No. 4,016,603, to Ottesen, for example, the disclosure thereof being hereby incorporated by reference.

Each data sector is of a predetermined fixed storage capacity or length (e.g. 512 bytes of user data per data sector); and, the density and data rates vary from data zone to data zone. Accordingly, it is intuitively apparent that the servo sectors 68 interrupt and split up at least some of the data sectors or fields into segments, and this is in fact the case in the present example. The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference. A presently preferred servo sector pattern is described in the referenced, copending U.S. patent application Ser. No. 07/569,065, now U.S. Pat. No. 5,170,299.

As shown in FIG. 6, a data track 71 includes a data block 76 for storage of a predetermined amount of user data, such as 512 or 1024 bytes of user data, recorded serially in 0,4,4 code bits in data field segments 76A, 76B and 76C of the depicted track segment. The data block 76 is shown in FIG. 6 to be interrupted and divided into segments of unequal length by several servo sectors 68 which contain embedded servo information providing head position information to the disk drive 10. Each data block 76 includes a block ID header field 74 at the beginning of the data block and a data ID header field 78 immediately preceding each data field segment including the segment 76A following the ID header 74, and the segments 76B and 76C following interruption by servo sectors 68. The data header field 78 is written at the same time that data is written to the segments 76A, 76B and 76C for example, and write splice gaps therefore exist just before each data ID header 78, before ID fields, and before servo fields, for example.

ADAPTIVE FIR FILTER 48

Figure 7:
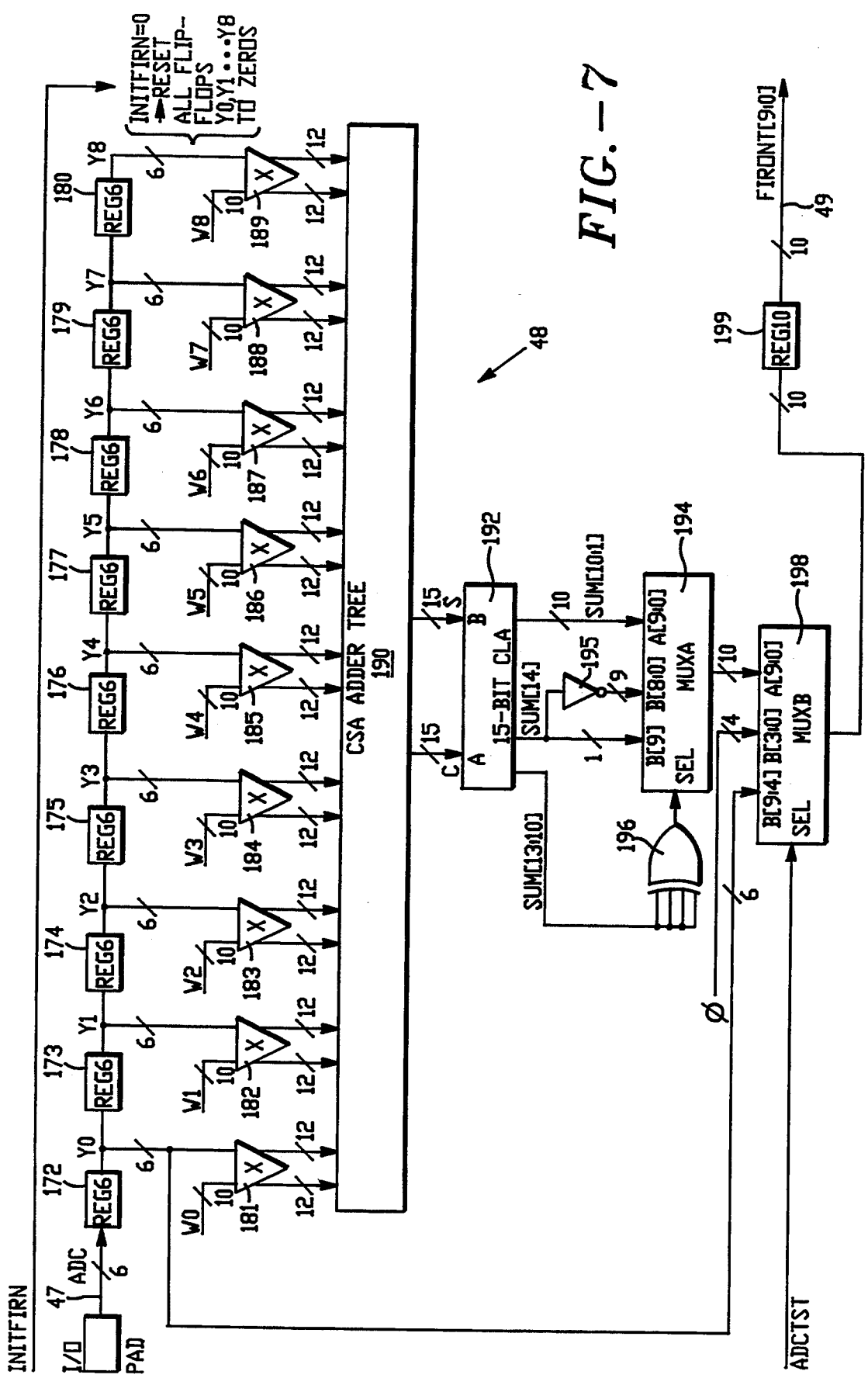
FIG. 7 is a detailed block diagram of a nine-tap programmable digital FIR filter of the FIG. 4 disk drive architecture in accordance with aspects of the present invention.

The adaptive FIR filter 48 is implemented as a nine tap digital finite impulse response filter generally following the circuitry depicted in FIG. 7. The filter 48 essentially comprises nine clock period, tandem connected delays 172, 173, 174, 175, 176, 177, 178, 179 and 180 connected progressively in tandem from the filter input line 47. There are nine multiplier stages 181, 182, 183, 184, 185, 186, 187, 188 and 189 connected respectively to taps y0 through y8 progressively taken along the delays 172 through 180 as shown in FIG. 7.

A six-level carry-save adder tree 190 employs known carry-save-add techniques to speed summation of the nine multiplier outputs with a minimized number of clock period latencies. A bit-pair recoding multiplier approach is followed in order to speed the multiplication process by enabling consideration of multiple ones of the multiplier bits simultaneously. Circuitry used within the multiplier stages 181-189 enabling bit-pair recoding is well known, see for example Cavanagh, *Digital Computer Arithmetic*, McGraw Hill Book Company, New York, N.Y. ©1984, pp, 159-173.

The resultant sums from the adder tree 190 are then combined in a carry lookahead adder circuit 192 and passed through a first multiplexer circuit 194. The sum, comprising bit positions [10:1] is provided directly to the multiplexer circuit 194, while a saturation value generated from sum [14] and an inverter 195 is presented at another input of the multiplexer 194. An overflow circuit comprising an OR gate 196 compares bits [13:10] of the sum put out by the adder 192. If all inputs are equal the OR gate 196 puts out a logical high value, and otherwise puts out a logical low value, thereby to control operation of the multiplexer 194. A second multiplexer 198 enables the FIR filter 48 to be bypassed in accordance with a control signal ADCTST. A cell delay register 199 delays the resultant output from the FIR filter 48 by one clock cycle and then puts conditioned data samples $\{y_k\}$ onto the bus 49.

There are nine 10 bit programmable multiplier coefficients w0, w1, w2, w3, w4, w5, w6, w7 and w8 which respectively feed into the multiplier stages 181 through 189. These programming coefficients w0-w8 control the characteristics of the FIR filter 48. Each coefficient is held in a ten bit register which feeds into each multiplier stage 181 through 189. The programmable multiplier coefficients may be provided from the register file 804 of the digital IC 17. During servo wedge time, servo coefficients are substituted for the data coefficients w0-w8 applicable to a particular data zone. When data zones are changed, new coefficients are provided to adapt the FIR filter 48 to the particular data zone. Thus, whenever data zones are changed, or selection of another data transducer head and data surface is made, or when servo data is being read from a servo sector, the microcontroller 56 obtains new coefficient values (12 bytes) from a storage location (such as the buffer 21) and loads them into the register file 804 of the digital ASIC 17. The new 10-bit coefficient values w0-w8 will then be provided to the multipliers 181-189 thereby to adapt the FIR filter 48 to the changed operating condition.

The filter coefficients may be adapted in real time by a filter coefficient adaptation circuit 222 based upon the incoming user data stream in a process known as "decision-directed" adaptation mode. Alternatively, or in addition to decision-directed adaptation, the coefficients may be adapted by an FIR filter training methodology carried out during a calibration routine, as at power on. Both approaches are discussed hereinbelow. During servo signal processing time, when the servo sector 68 interrupts the data field 76, servo coefficients are loaded into the FIR filter 48 to configure it as a low pass filter suitable for filtering the servo ID field information 68B.

The provision of nine taps in the adaptive FIR filter 48 has been discovered to be ideally appropriate within the presently preferred disk drive architecture 10 for a wide variety of responses from presently available thin film data transducer heads. Basically, responses of thin film heads responding to test patterns recorded at varying data densities were measured and recorded. In terms of measured performance compared with FIR filter circuit complexity, diminishing performance gains are realized when the adaptive FIR filter 48 is structurally or functionally extended beyond about nine taps.

The incoming data signal, $x_k$, on the path 47 has a 6 bit resolution extending between $-1$ and $1\text{-}2^{-5}$ (as coded in 2s complement notation). The adaptive multiplier coefficients w0-w8 are each 10 bits in resolution, including one sign bit, and nine following fractional positions. When each 6 bit coefficient is multiplied by a 10 bit multiplier, a 16 bit product normally would result. In practice, the multiplier outputs in carry-save form are limited to 12 bits, with three lower order bits being truncated and generation of the final MSB being deferred to the CSA tree 190. In order to detect the overflow that might occur when adding the nine multiplier 12-bit results, 15 bits are required at the CSA tree 190 output. If there is an overflow in the CLA 192 output, the 10-bit result is saturated at values of either $-1$ or $-2^{-9}$, depending upon sign.

In practice, the FIR filter 48 is adapted to different head responses. Every data transducer head will be expected to have a different response to data recorded in each one of the data zones shown in FIG. 5. The filter coefficients w0-w8 are adapted so that the action of filtering the read signal generated by a particular head and zone produces output samples corresponding to a PR4 $(1-D^2)$ response. This adaptability thus enables acceptance and use of a much broader range of heads and media in manufacturing. The resultant disk drive system 10 can thus have relaxed tolerances for heads and media relative to a drive having only a fixed filter. Another advantage is that there is no need to compromise for various locations and characteristics from the disk. The FIR filter 48 can be adaptively optimized in real time for every zone, instead of being restricted to a single, compromised setting for all zones.

While it is understood in the art that 6 bits of resolution are needed for the samples $x_k$ at the input path 47, the need for 10 bits of resolution in the adaptive update of the filter coefficients has not generally been known or understood. This 10 bit requirement results from use of the "signed-LMS" (least mean square) algorithm.

ADAPTATION OF FIR FILTER 48

As previously mentioned, the digital FIR filter 48 is capable of being adapted to the channel conditions so as to produce the desired PR4 channel response as graphed in FIG. 1. As noted above, the preferred adaptive algorithm used to adapt the FIR filter 48 is the so-called "signed-LMS" algorithm described by:

$$\underline{w}_{k+1} = \underline{w}_k - \mu e_k sgn(\underline{x}_k) \qquad (1)$$

where $\underline{w}_k = [w0, w1 \ldots w8]$ is a vector of filter coefficients at time k, $\mu = 2^{-P}$, where $(1 < p < 8)$, is a programmable step size, $e_k = y_k - dkval \cdot_k$, and $\underline{x}_k = [x_k, x_{k-1} \ldots x_{k-8}]$ is a vector of delayed filter input values. The variable $y_k$ represents the filter output, and the variable $\hat{y}_k$ represents the "desired response"; i.e., the desired filter output value at time k. The desired response for $\hat{y}_k$ is 1 if $y_k > $ THP, 0 if $-$THP $\leq y_k \leq $ THP, or $-1$ if $y_k < -$THP the signum function is defined by:

$$\text{sgn}(x) = 1 \text{ for } x \geq 0 \quad (2)$$
$$= -1 \text{ for } x < 0 \quad (3)$$

By way of further explanation and contrast with the presently preferred method, the standard LMS algorithm is described by:

$$w_{k+1} = w_k \mu e_k x_k \quad (4)$$

The main drawback of the standard LMS algorithm is the complexity of the $e_k x_k$ multiplication. The present inventors have discovered that by using signed LMS instead, performance losses as measured by filter output signal-to-noise ratio are very small, and typically less than 0.2 dB. At the same time, complexity in the filter coefficient adaptive update is greatly reduced, since the $e_k x_k$ multiplication is avoided.

Figure 8:
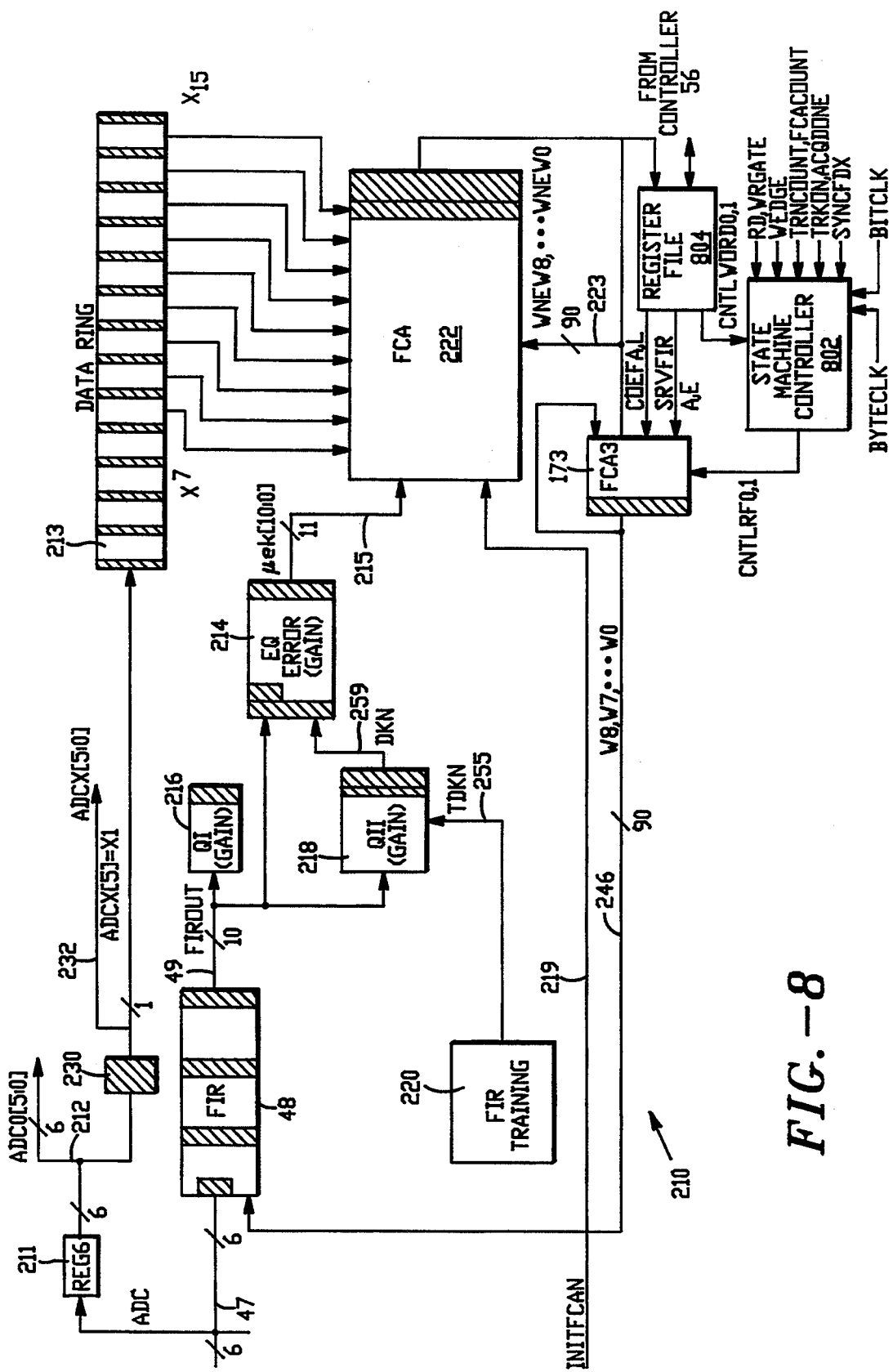
FIG. 8 is a block diagram of an FIR filter coefficient adaptation circuit for adapting the FIG. 7 FIR filter to read channel conditions within the FIG. 4 disk drive architecture.
Figure 12:
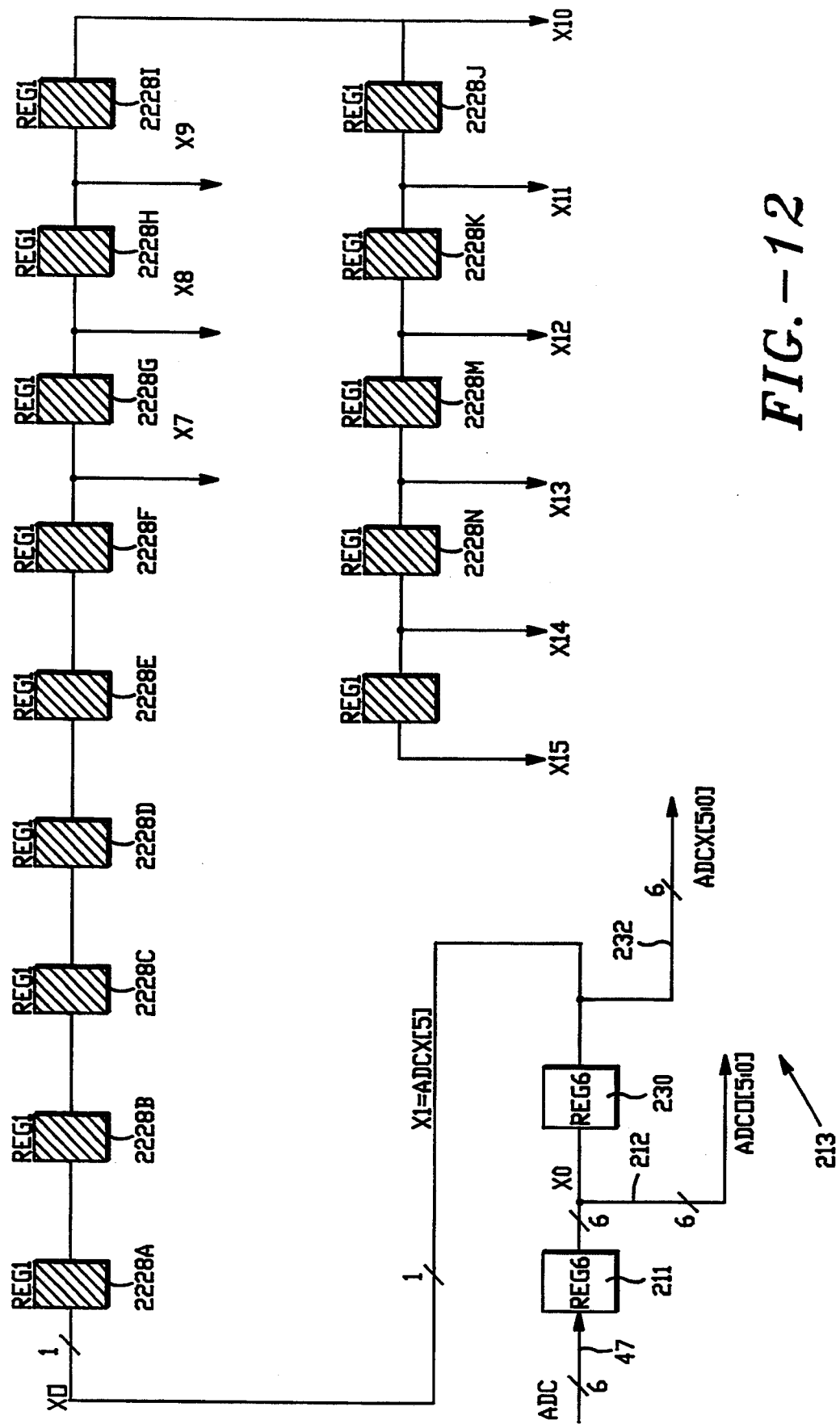
FIG. 12 is a more detailed block diagram of a data ring circuit block shown in FIG. 8.

An overall FIR filter adaptation architecture 210 is illustrated in FIG. 8. The incoming raw data samples on the path 47 are clocked through a register 211 to a path 212, and through a second register 230 to a path 232. The path 232 leads through a data ring 213 (FIG. 12) comprising a series of fourteen flip-flops 228a, 228b, 228c, 228d, 228e, 228f, 228g, 228h, 228i, 228j, 228k, 228m, and 228n, which are synchronously clocked at the ADCLK rate. Outputs from the sixth through the fourteenth flip-flops provide respectively X[7] through X[15] values which are applied as multiplier values to a filter coefficient adaptation circuit 222, described in greater detail in connection with FIGS. 9 and 10.

As shown in FIG. 4, the output path 49 from the FIR filter 48 leads directly to the digital gain control circuit 64. Several of the elements of the gain control circuit 64 are shown in FIG. 8 and are used with the filter coefficient adaptation circuit 222 to provide updated filter coefficients. One of the elements of the digital gain control circuit 64 is an equalizer error computation block 214. Other elements include a first gain quantization block 216 which is normally active during an initial gain acquisition mode to set the PR4, ML channel gain, and a second gain quantization block 218 which is normally active during a subsequent tracking mode to maintain proper gain characteristics in the PR4, ML channel while user data is being read. The second gain quantization block 218 also provides an output dkn which feeds into the equalizer error block 214. The equalizer error block 214 within the gain control circuit 64 calculates and puts out $\mu e_k$ values on a path 215 to the filter coefficient adaptation circuit 222.

An FIR filter training circuit 220 provides an output TDKn on a path 255 which feeds into the second gain control block 218. FIR filter coefficient adaptation training mode is discussed in the section immediately following this section.

Figure 9:
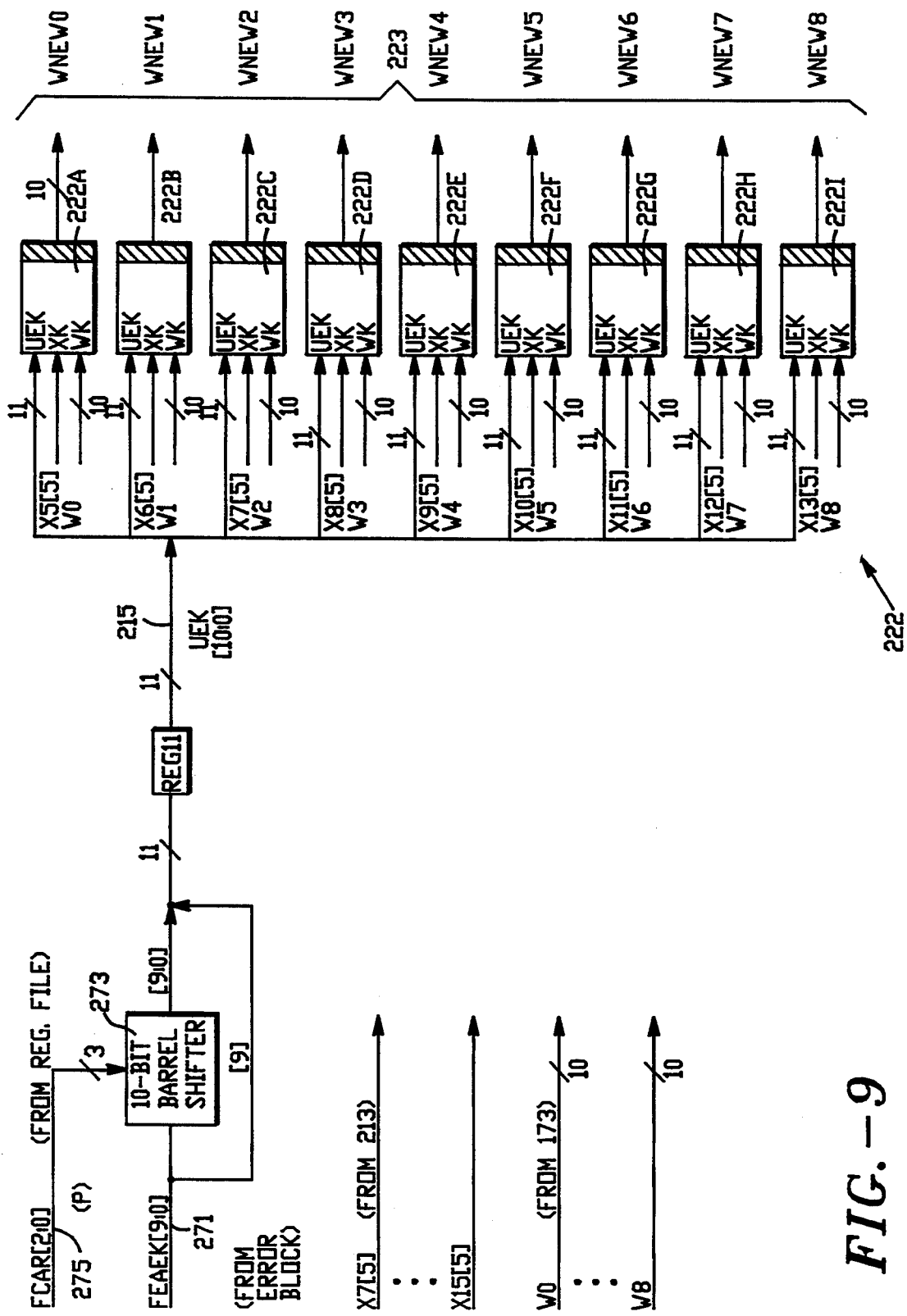
FIG. 9 is a detailed block diagram of a portion of the filter coefficient adaptation circuit block shown in FIG. 8.

The filter coefficient adaptation circuit 222 includes nine coefficient calculation circuits 222a, 222b, 222c, 222d, 222e, 222f, 222g, 222h, and 222i, as shown in FIG. 9. These circuits implement a signed least mean squares recursive coefficient adaptation methodology which is preferred in providing coefficient adaptation in accordance with the equation:

$$w_{k+1} = w_k - \mu e_{k-L} \text{sgn}(x_{k-L}) \quad (1')$$

wherein all variables are as defined above. It should be noted that in order to achieve a high speed implementation, pipelining is used. The pipelined architecture introduces the delay term "L" in the update term of equation (1').

Figure 10:
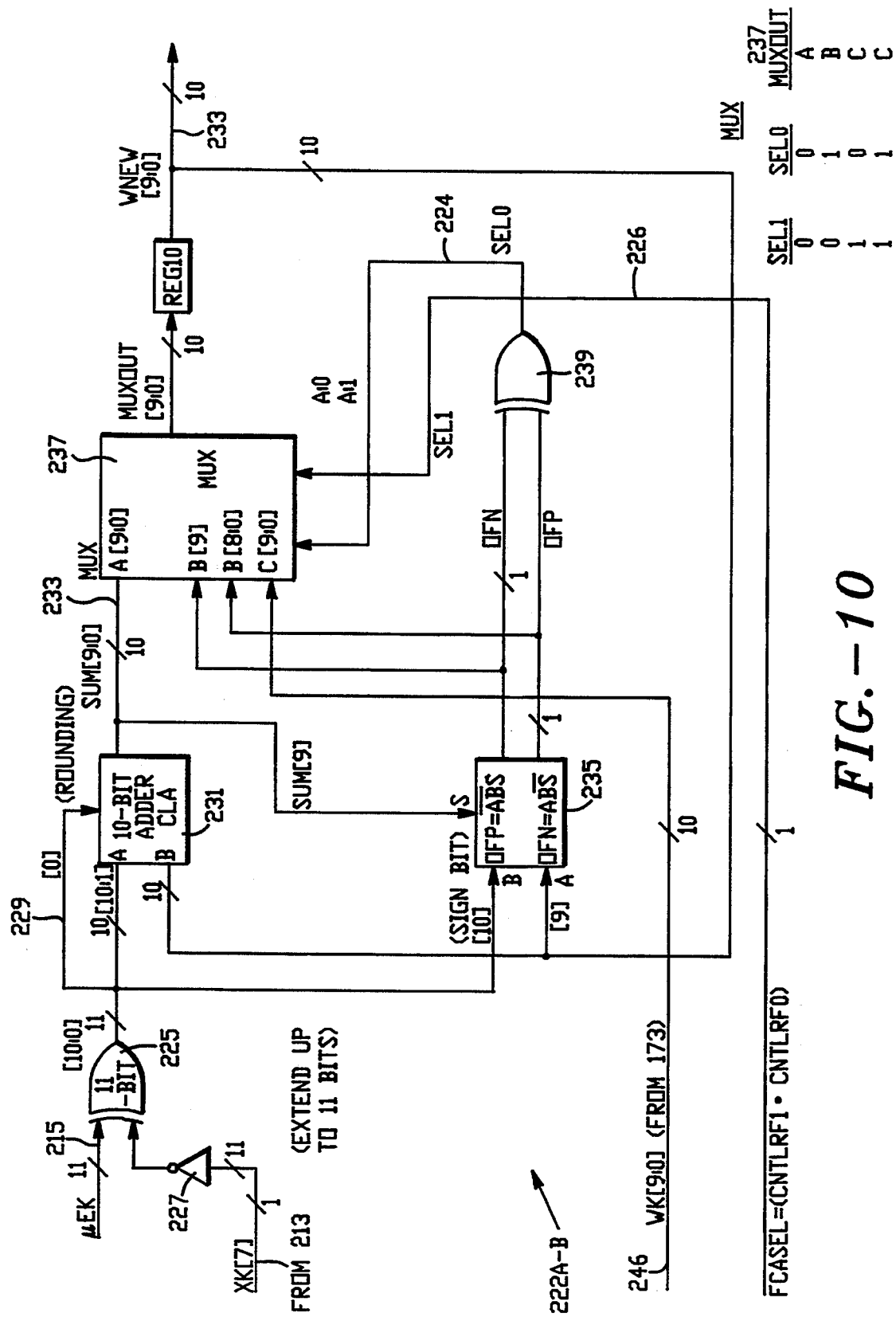
FIG. 10 is a detailed block diagram of one of nine processing circuits within the FIG. 9 filter channel adaptation circuit block.
Figure 11:
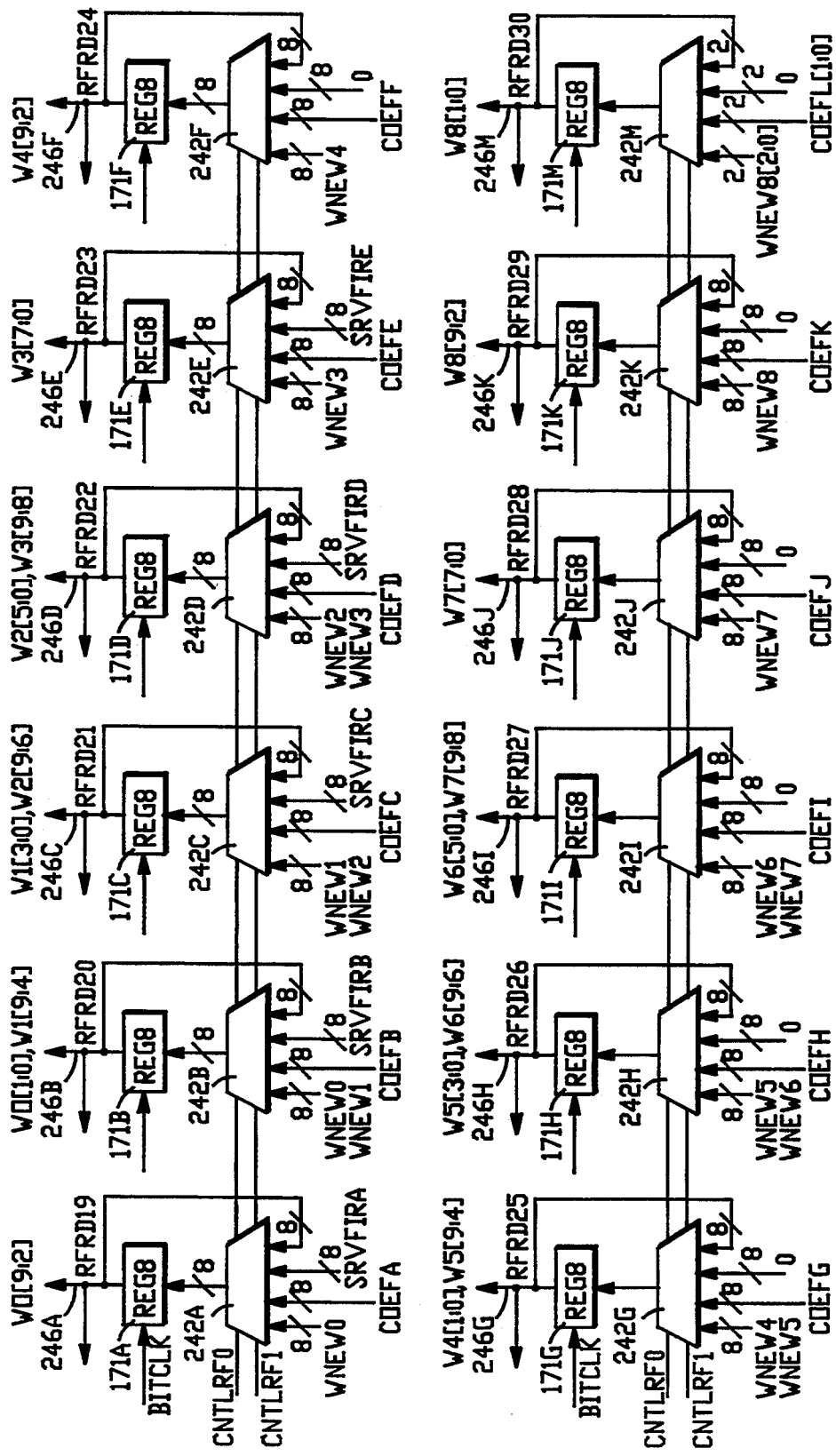
FIG. 11 is a block diagram of a coefficients multiplexer array used selectively to provide coefficient values to the FIG. 7 FIR filter.

A representative one of the calculation circuits 222a-i, is illustrated in FIG. 10. Therein, the $\mu e_k$ value on the path 215 is multiplied by a number which is the inverse of the bits $x_k$ from the data ring 213. An exclusive-OR gate array 225 and an inverter array 227 implement the multiplication. The resultant eleven bits of the product are applied on a path 229 to one input of a ten-bit carry look-ahead adder 231. Another input to the adder 231 is provided by the coefficients $w_{new}$ which are applied over a path 233. The resultant sum put out over a path 233 comprises the updated ten bit coefficient. An overflow logic circuit 235 monitors the sum on the path 233 and provides positive and negative saturation outputs in the event of overflow. The sum on the path 233 and the positive and negative saturation values are applied as inputs to a multiplexer 237. An OR gate 239 tests high bit outputs from the overflow and puts out a control signal SEL0 on a path 224 to cause the multiplexer 237 to select and put out overflow saturation values OFP and OFN, in lieu of the sum, as the new coefficient whenever an overflow has been detected. Another control signal SEL1 on a path 226 causes the multiplexer 237 to be preset with and put out coefficients wk supplied from the coefficient selector circuit 173 (FIG. 11). The control SEL1 overrides the control SEL0.

Turning to FIG. 11, the coefficient selector circuit 173 includes twelve eight bit registers 171a, 171b, 171c, 171d, 171e, 171f, 171g, 171h, 171i, 171j, 171k and 171m, which are provided to hold the nine ten-bit coefficients. Since these are eight bit registers, several registers are needed to hold the bits of each ten bit coefficient. The last register 171m only holds two bits. There are twelve multiplexers 242a-m which are also associated with the twelve registers 171a-m, and each multiplexer 242 includes four inputs, controlled by two control lines CNTLRF0 and CNTLRF1 generated by a state machine controller 802 responsive to real time operating conditions, such as Bit Clock, Byte Clock, Read Gate, Write Gate, Servo Wedge, Sync Bit Found. One input is the updated coefficient $w_{new}$ which is recursively generated and put out by the filter coefficient adaptation circuit 222. Another input COEF is provided directly from a control register file 804 contained within the digital IC 17. This file is written by the microcontroller 56 via the bus 55, and it holds coefficients w0-w8 for e.g. a newly selected data zone 70 which is being accessed by the head positioner servo 24, for example. These coefficient values are typically values which were developed during the FIR training routine from the training track of a particular zone, or which were the most recent values developed by the adaptation circuit 222 when the particular data zone was last accessed. However, these values are static values. A third input to registers 242a-e is provided for the servo coefficient values SRVFIRA-E which are also stored in the register file 804. In servo mode, registers 242f-m are loaded with null (zero) values. A final input to the registers 242a-m is a loop back path 246 taken from the output of each register 171 and which thereby implements and provides a latch function for holding the present coefficient value being applied to the multipliers 188-204.

FIR FILTER TRAINING

Since analog data signals vary from the inside diameter zone 70-9 to the outermost zone 70-1, and since these signals also vary from head to head, and may vary with temperature, etc., the performance of the FIR filter 48 is enhanced by "training". By "training" is meant that a known data pattern reproduced from the disk surface is compared with a reference encoded data pattern. Any errors are used to adjust the FIR filter coefficients such that the squared-error value is minimized.

In accordance with principles and aspects of the present invention, each data zone is provided with a dedicated training track or sector 71$t$ which has been recorded with a known pseudo-random data pattern. In the present example, the Galois field data block pattern for use with the Reed-Solomon error correction circuit 54 is used for convenience. This Galois field pattern is in accordance with the following:

$$P(x) = x^8 + x^4 + x^3 + x^2 + 1 \quad (5)$$

and wherein $$\text{alpha}[1] = x^5 + x^3 + x + 1. \quad (6)$$

This Galois field pattern is e.g. contained as a lookup table in a firmware memory location accessed by the microcontroller 56. It may also be embedded within the digital chip 17 to reduce access times during filter training operations. The training track or sector 71$t$ is preferably located at the center of each data zone 70 and therefore represents an average track characteristic for that particular zone. The training track or sector follows the format set forth in FIG. 6, for example, but does not include any user data, the data fields being occupied with the known pseudo-random data pattern.

Figure 13:
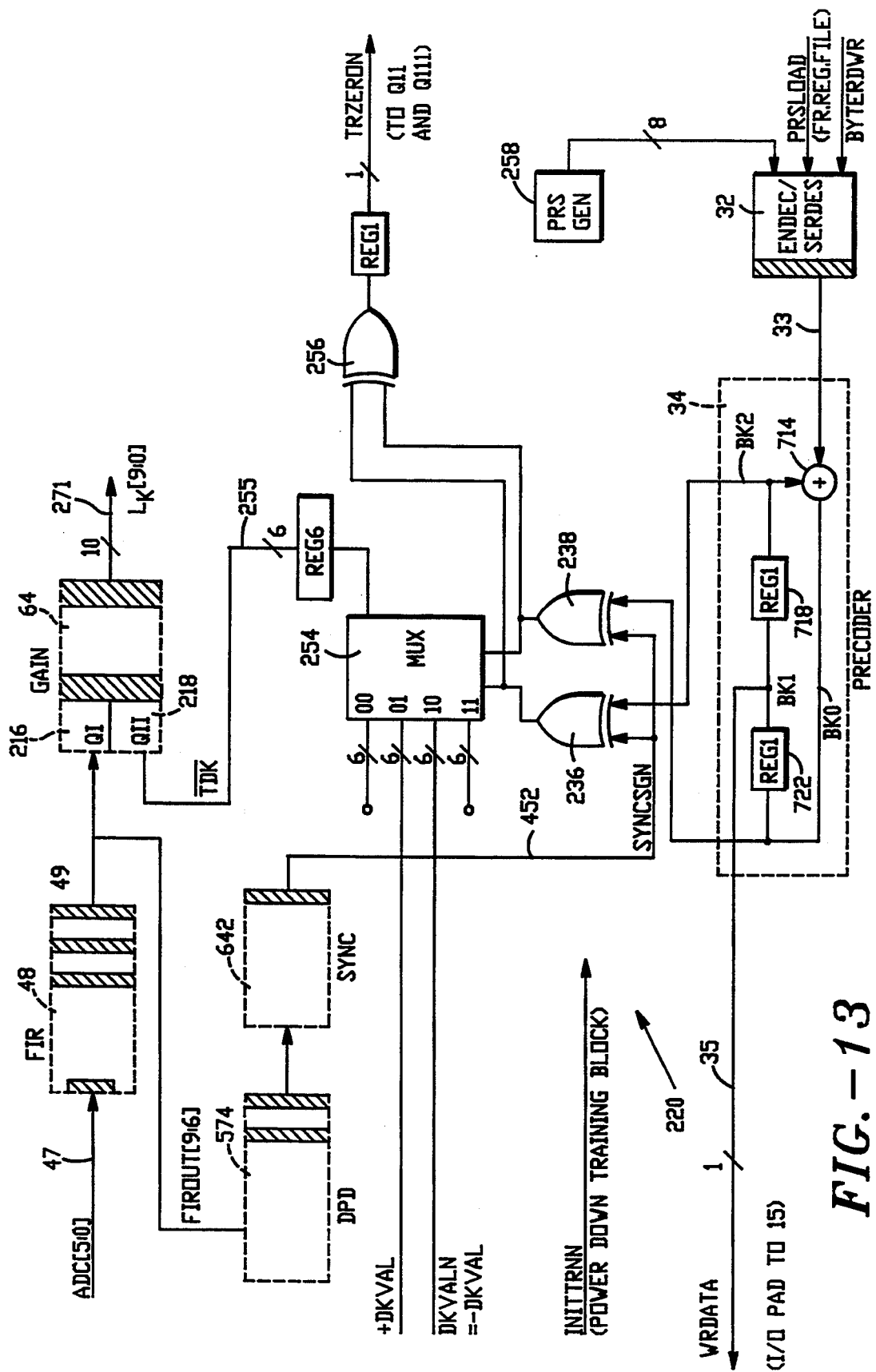
FIG. 13 is a block diagram illustrating aspects of FIR filter training in accordance with aspects of the present invention.
Figure 14:
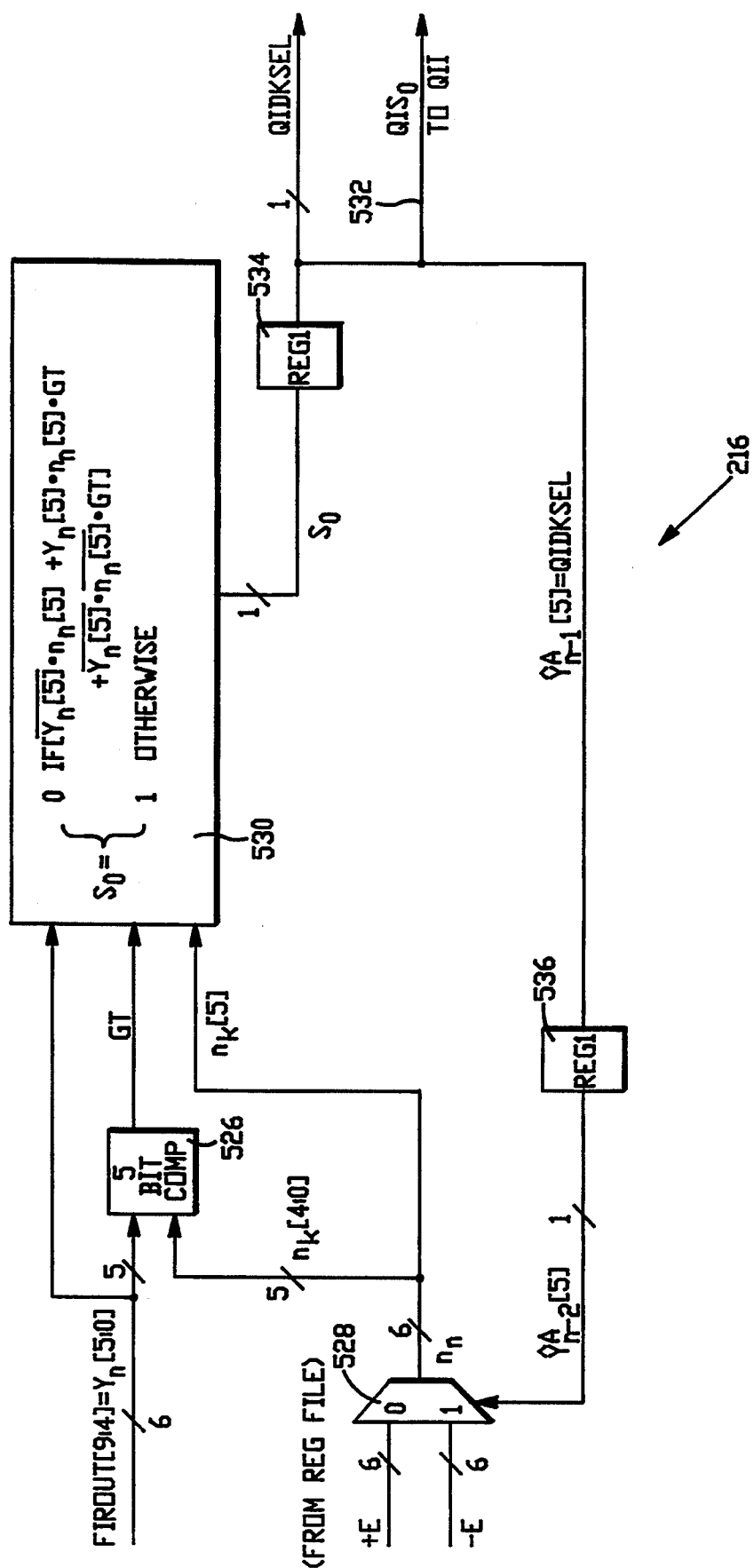
FIG. 14 is a detailed block diagram of an acquisition quantizer calculation circuit within the digital gain control block shown in FIG. 13.

FIR filter training mode circuitry is shown in FIG. 13. Therein, the FIR filter training circuit 220 includes two exclusive-OR gates 236 and 238 which have one commonly connected input. The commonly connected input receives a signal on a path 452 taken from the read channel including the FIR filter 48, a sync/servo digital peak detector circuit 574, and a sync pattern recognition circuit 642. Another input of the exclusive-OR gate 236 is connected to a BK2 output of the precoder 34 within the write mode circuitry. Another input of the exclusive-OR gate 238 is connected to a BK0 output of the precoder 34. The precoder 34 is described in further detail in conjunction with FIG. 47 of the referenced patent application Ser. No. 07/937,064.

Eight bit pseudo-random data bytes from a pseudo-random sequence source 258 (such as the Galois field ECC data pattern) are passed through the ENDEC/SERDES 32 and become nine-bit, serial (0,4,4) code patterns which are then passed through the precoder 34. A SYNCFOUND control signal initiates this process. An output BK1 from the precoder (available when the channel is in "write" mode) provides the write data signal WRDATA on the path 35 which leads to the write driver 36. The other two outputs BK0 AND BK2 are applied as inputs to the exclusive-OR gates 236 and 238.

The SYNCSGN output from the sync pattern recognition circuit 642 indicates whether the synchronization peak was positive or negative. The sign of the sync pulse within the ID field header 78 is needed to determine the polarity of the reference signal that will be compared to the data being read back from the disk during the FIR filter training mode and this sign value is applied to the exclusive-OR gates 236 and 238 over a path 452. The outputs from the exclusive-OR gates 236 and 238 are used to select the input to a multiplexer 254. The multiplexer 254 selects one of three inputs: dkval, zero, and dkvaln. The output from the multiplexer 254 is thus an idealized ternary reference PR4 output data stream based upon the input data being generated by the pseudo-random sequence generator 258. The output on a path 255 comprises a six bit $\overline{TDK}$, signal (-reference data) which is sent into the second gain loop quantizer circuit 21 8.

After the precoder 34 has been initialized to {0,0}, or to {0, 1}, the output from the multiplexer 254 is in accordance with the following table:

| SYNCSGN on 452 | Bk0 | Bk2 | $2^1$, | $2^0$, | $\overline{Tdk}$ |
|---|---|---|---|---|---|
| 0(+) | 0 | 0 | 0 | 0 | 0 |
| 0 | 0 | 1 | 1 | 0 | −dkval |
| 0 | 1 | 0 | 0 | 1 | +dkval |
| 0 | 1 | 1 | 1 | 1 | 0 |
| 1(−) | 0 | 0 | 1 | 1 | 0 |
| 1 | 0 | 1 | 0 | 1 | +dkval |
| 1 | 1 | 0 | 1 | 0 | −dkval |
| 1 | 1 | 1 | 0 | 0 | 0 |

Alternatively, the precoder 34 may be initialized to {1,1}, and the output from the multiplexer 254 is in accordance with the following:

| SYNCSGN on 452 | Bk0 | Bk2 | $2^1$, | $2^0$, | $\overline{Tdk}$ |
|---|---|---|---|---|---|
| 1(−) | 0 | 0 | 0 | 0 | 0 |
| 1 | 0 | 1 | 1 | 0 | −dkval |
| 1 | 1 | 0 | 0 | 1 | +dkval |
| 1 | 1 | 1 | 1 | 1 | 0 |
| 0(+) | 0 | 0 | 1 | 1 | 0 |
| 0 | 0 | 1 | 0 | 1 | +dkval |
| 0 | 1 | 0 | 1 | 0 | −dkval |
| 0 | 1 | 1 | 0 | 0 | 0 |

Figure 15:
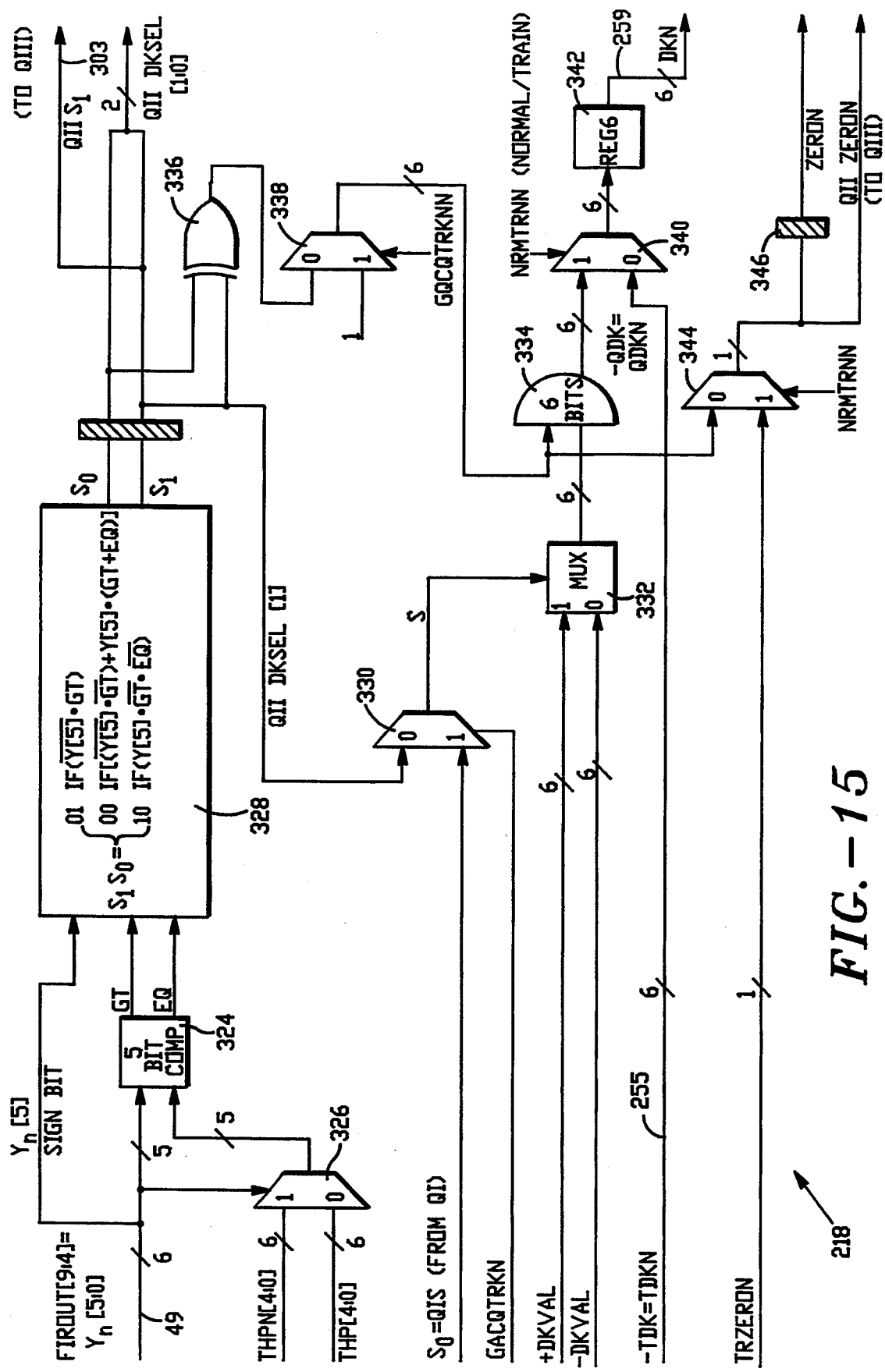
FIG. 15 is a detailed block diagram of a tracking mode quantizer calculation circuit within the digital gain control block shown in FIG. 13.

With reference to FIG. 15, the tracking mode gain loop quantizer circuit 218 is depicted. This circuit is used during tracking mode by both the gain and timing loops. The $\overline{TDK}$ signal on the path 255 passes through a multiplexer 340 which is set to FIR filter training mode by a normal/training logical signal NRMTRNN and passes through a cell delay register 342 and out of the circuit 218 as a $\overline{DK}$ signal on a path 259 and into the timing equalizer error circuit 214 (FIG. 16).

Figure 16:
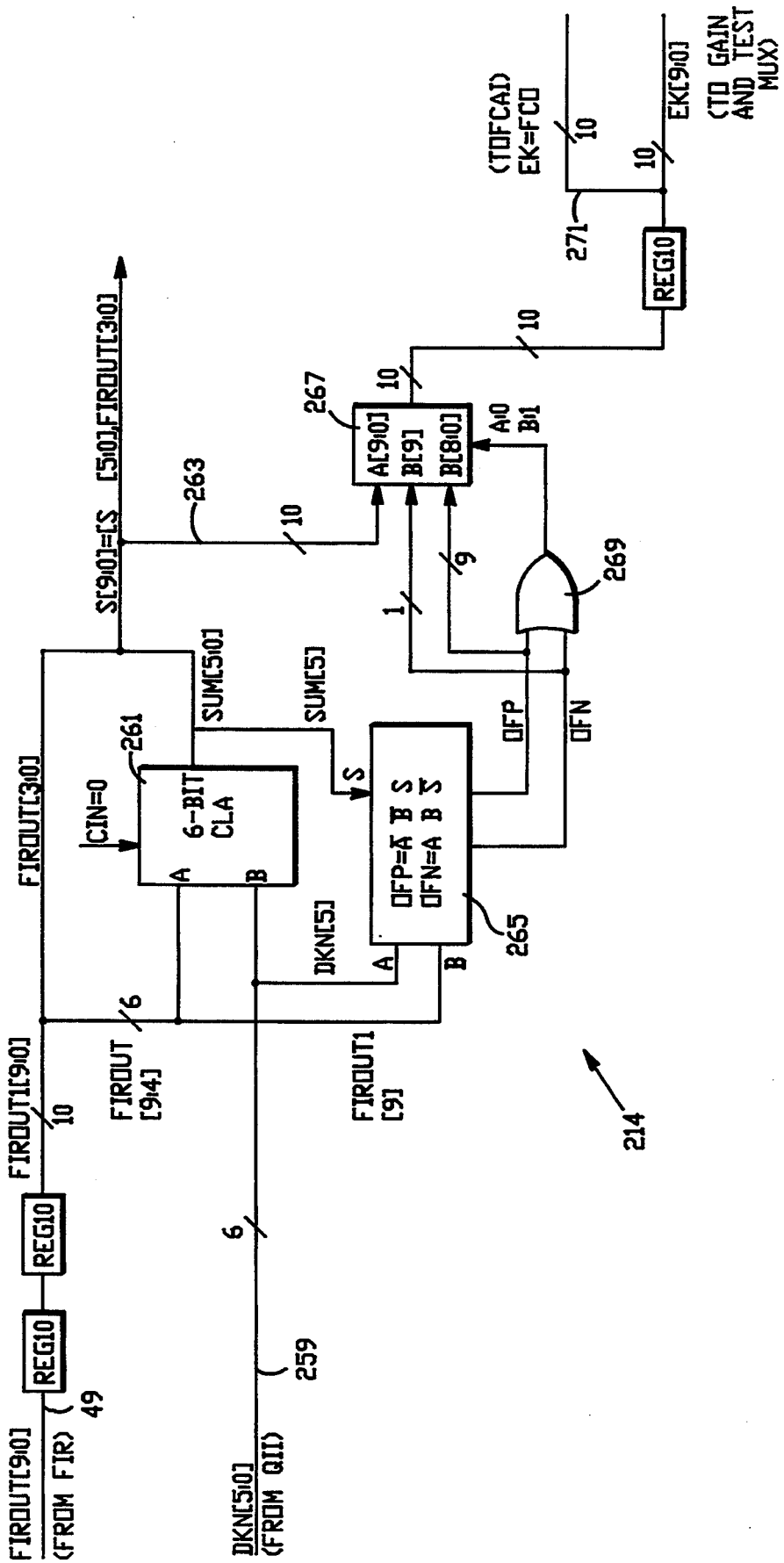
FIG. 16 is a detailed block diagram of an equalizer error calculation circuit within the digital gain control block shown in FIG. 13.

At the same time, the conditioned digital data sample stream from the FIR filter 48, representing the equalized output corresponding to the pseudo-random sequence test pattern being reproduced simultaneously from a selected training track 71$t$ is applied over the path 49 directly to the equalizer error circuit 214 depicted in detail in FIG. 16. The equalizer error circuit 214 adds the $\overline{DK}$ value on the path 259 to the six high order bits of the 10 bit signal on the path 49 in a carry lookahead adder circuit 261 to produce a 10 bit result on a path 263 on which the low order four bits from the FIR filter 48 are mapped around the adder circuit 261 and appended to the resultant six bit sum therefrom. An overflow circuit 265 checks for overflow and puts out a positive or negative overflow saturation value through a multiplexer 267 as the overflow case may be. An OR gate 269 controls selection of the multiplexer 267 between the error value on the path 263 and the saturation values from the overflow circuit 265.

The resultant $e_k$ value is then passed through a delay latch and then supplied over a path 271 to a ten bit barrel shifter circuit 273 (FIG. 9) which multiplies the resultant $e_k$ by a value $\mu$ which is developed from a minus exponent p on a path 275, where $\mu = 2^{-p}$. The value p is a value which is stored in the register file 804 and represents the previously described programmable coefficient adaptation step size. The resultant product put out by the barrel shifter 273 is thus the $\mu e_k$ value which is applied over the path 215 to the filter coefficient adaptation circuit 222, as shown in FIG. 8.

During the filter training mode, the error value on the path 215 causes the recursive adaptation circuit 222 to adjust the filter coefficients to minimize the squared-error value. The coefficients thus developed during the training mode are stored in the eight bit registers 171 shown in FIG. 11. The microcontroller 56 obtains these values via the bus structure 55 and stores them in a storage location designated by firmware for storage of coefficients for the particular data zone 70-n. This process is repeated for each head and data zone, and coefficients for the FIR filter 48 are developed and stored. The FIR filter training mode is carried out normally as a part of a drive calibration routine which may occur during a power up sequence, and subsequently during periodic drive recalibration routines. Before entering the training mode the FIR coefficients are preloaded to an initial state that facilitates rapid convergence of the signed-LMS algorithm.

Returning to FIG. 15, in a decision-directed FIR filter adaptation mode carried out in real time during user data reading operations, the state of the multiplexer 340 selects and puts out a decision based on the FIR filter output as the $\overline{DK}$ value for every data sample over the path 259 to the equalizer error circuit 214, FIG. 16. This estimated decision value is then processed by the equalizer error circuit 214 to produce a new $\mu e_k$ value on the path 215 which results in update of coefficient equation (1'). New coefficients are thus provided at each new data sample time. With the foregoing description of the equalizer error circuit 214 in mind, it will now be appreciated that the described circuitry will provide for adaptive updating of the FIR filter coefficients based upon user data in the decision directed filter adaptation mode, as well as in the FIR filter training mode.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A digital adaptive finite impulse response filter circuit within a partial response, maximum likelihood sampled data detection channel having characteristics which change during operation of the detection channel in a controlled way and also including an analog to digital sampling and conversion means (46) for receiving and quantizing a coded data stream within the detection channel into raw digital samples and for providing the raw digital samples to an input (47) of the digital adaptive finite impulse response filter circuit and a sampled data detector means (50) for detecting coded digital data from conditioned digital samples received from an output (49) of the digital adaptive finite impulse response filter circuit, the digital adaptive finite impulse response filter circuit comprising:

a multi-tap transversal filter (48) including a series of unit delays connected between the input (47) and the output (49) and wherein each delay is related to a sampling interval of the analog to digital sampling and conversion means, taps between the unit delays for providing tap values, process nodes connected to respective taps, and a summing circuit for summing products put out from the process nodes, and wherein each process node is connected to multiply a tap value received from a respective tap by a coefficient of a selected set of coefficients, a digital register file (804) for storage of a plurality of sets of coefficients, each set of coefficients for changing data detection channel characteristics, a multiplexer (173) connected to said digital register file (804) for selecting and providing said selected set of coefficients from the plurality of sets of coefficients and for supplying the selected set to the process nodes of the transversal filter (48), and control means for changing the detection channel characteristics of the data detection channel by controlling said digital register file and said multiplexer (173) for selecting and providing a different one of the plurality of sets of coefficients to the process nodes of the transversal filter (48) to change detection channel characteristics during operation of the detection channel.

2. The filter circuit set forth in claim 1 wherein said partial response, maximum likelihood sampled data detection channel manifests a class IV spectrum and wherein said multi-tap transversal filter includes nine unit delays and comprises nine taps and nine process nodes.

3. The filter circuit set forth in claim 1 wherein said control means includes a digital microcontroller (56) and a state machine controller (802) connected to said digital register file (804) and directly responsive to the detection channel, and wherein said digital register file is accessed by said digital microcontroller and said multiplexer is controlled by said state machine controller (802) to change the selected set of coefficients.

4. The filter circuit set forth in claim 1 further comprising a filter coefficient adaptation circuit (222) connected to the input (47) and to the output (49) and also connected to the multiplexer (173), for generating sets of updated filter coefficients in real time from raw data samples and from conditioned data samples and for supplying said sets of updated filter coefficients to said multiplexer (173), the control means for controlling the multiplexer (173) to select and provide one of said sets of the updated filter coefficients to process nodes of the transversal filter (48).

5. The filter circuit set forth in claim 4 wherein the sampled data detection channel has an operational mode and a filter training operational sequence, both the operational mode and the filter training sequence being controlled by the control means, and further comprising a finite impulse response filter training circuit (220) for generating and supplying reference data samples to the filter coefficient adaptation circuit (222) during the filter training operational sequence, and further comprising a reference data source within the data channel for supplying data nominally corresponding to the reference data samples to the analog to digital sampling and conversion means (46) during the filter training operational sequence, the control means being connected to the data detection channel to start the filter training operational sequence and during the filter training operational sequence for controlling the filter training circuit, the filter coefficient adaptation circuit, the reference data source, the multiplexer and the register file in order to generate and store a set of coefficients adapted during the filter training sequence in the register file for subsequent use during operational mode of the sampled data detection channel.

6. A partial response, maximum likelihood data detection channel for a disk drive including a rotating data storage disk having at least one data storage surface, a data transducer head positionable relative to selected ones of a multiplicity of concentric data tracks formed on the at least one data storage surface wherein said data tracks are arranged in a plurality of radial zones wherein each radial zone includes user data recorded at a data transfer rate selected with regard to the radial displacement of said each radial zone from an axis of rotation of the disk, the channel comprising:

quantization means for quantizing samples of user data read from a selected data track within one of the plurality of radial zones, adaptive digital finite impulse response filter means downstream of said quantization means for filtering said samples in accordance with filter coefficients selected for said one of the plurality of radial containing the selected data track having recorded user data from which said samples have been obtained, Viterbi detector means downstream of said adaptive digital finite impulse response filter means for maximum likelihood decoding of said filtered digital samples, storage means for storing and providing the filter coefficients for each radial zone to the adaptive digital finite impulse response filter means, and control means for controlling the storage means to supply the filter coefficients to the adaptive digital finite impulse response filter means in accordance with selection of the data track of said one of the plurality of radial zones to be read.

7. The data detection channel set forth in claim 6 wherein the data storage surface of the disk includes servo sectors recorded at a predetermined data rate different than a data rate for data of a particular data zone and wherein the storage means stores servo filter coefficients for the servo sectors, and wherein the control means causes the storage means to put out said servo filter coefficients to the adaptive digital finite impulse response filter means when said servo sectors are being read by the data transducer head.

8. The data detection channel set forth in claim 6 further comprising filter training adaptation means selectively connected to the adaptive digital finite impulse response filter means for adapting filter characteristics for each radial zone based upon quantized samples read from a predetermined training track location prerecorded with a known data pattern within each radial zone, and further comprising:

reference data pattern generation means for generating a reference data pattern nominally corresponding to the known data pattern for one of the plurality of radial zones, comparison means for comparing the quantized samples corresponding to the known data pattern obtained from the training track of said one of the plurality of radial zones with the reference data pattern supplied by the reference data pattern generation means for generating a filter adaptation value, the adaptation means for receiving the adaptation value and for thereupon adapting the filter characteristics for said one of the plurality of radial zones, and the control means for controlling the position of the data transducer head to read the predetermined training track location, and for connecting the adaptation means to the adaptive finite impulse response filter means to supply the adapted filter coefficients thereto.

9. The data detection channel set forth in claim 8 wherein the reference data pattern generation means is in accordance with a polynomial generator function used by a Galois field generation means of a Reed-Solomon error correction circuit of the disk drive.

10. The data detection channel set forth in claim 6 wherein said control means includes a digital microcontroller, and wherein said source of a plurality of coefficients for each tap comprises digital memory storage addressed by said digital microcontroller.

11. The data detection channel set forth in claim 6 further comprising decision directed adaptation means selectively connected to the adaptive digital finite impulse response filter means by the control means and including coefficient adaptation generation circuit means for generating updated filter coefficients in real time during a decision directed operational mode of the data channel controlled by the control means from conditioned data samples received from the filter means and for supplying said updated filter coefficients to said filter means in real time.

12. In a partial response, maximum likelihood sampled data detection channel including a clocked analog to digital converter for converting analog data values from an analog signal stream into raw digital samples, a digital adaptive finite impulse response (FIR) filter circuit for conditioning the raw digital samples received from the clocked analog to digital converter and for putting out conditioned data samples, and a sampled data detector means for detecting coded data from the conditioned data samples, a method for adapting characteristics of the FIR filter circuit comprising the steps of:

storing a plurality of filter coefficients sets in a digital memory, wherein one of the filter coefficient sets is obtained by the step of operating the FIR filter circuit in a training mode, and wherein the training mode comprises the steps of:

providing a known data pattern sequence at a reference source thereof, passing the known data pattern through the partial response, maximum likelihood sampled data channel including the clocked analog to digital converter and the digital FIR filter circuit to provide conditioned training data samples, comparing the known data pattern sequence from the reference source thereof with the conditioned training data samples to develop a training error value, using the training error value to provide training-adapted filter coefficients, applying the training-adapted filter coefficients to the filter circuit means recursively to modify the characteristics thereof so that the training error value is reduced, and storing the training-adapted filter coefficients in the digital memory as one of the plurality of filter coefficients sets, selecting with a multiplexer the training-adapted filter coefficients set stored in the digital memory, and applying selected filter coefficients set to taps of the FIR filter circuit, thereby adapting the characteristics of the FIR filter circuit.

13. In a partial response, maximum likelihood sampled data detection channel including a clocked analog to digital converter for converting analog data values from an analog signal stream into raw digital samples, a digital adaptive finite impulse response (FIR) filter circuit for conditioning the raw digital samples received from the clocked analog to digital converter and for putting out conditioned data samples, and a sampled data detector means for detecting coded data from the conditioned data samples, a method for adapting characteristics of the FIR filter circuit comprising the steps of:

storing a plurality of filter coefficients sets in a digital memory, wherein one of the sets is obtained by the step of operating the FIR filter circuit in a decision-directed mode to obtain decision-directed filter coefficients from conditioned data samples, the decision-directed filter coefficients being obtained in accordance with:

$$w_{k+1} = w_k \mu e_{k-L} \Sigma (x_{k-L})$$

where $w_k$ is a vector of filter coefficients at time k, $\mu = 2 - P$ where p is a programmable step size, $e_{k} = y_k - dkval \cdot \hat{y}_k$ where $y_k$ comprises a conditioned data sample, $\hat{y}_k$ represents a desired filter response at time k, and dkval comprises a programmable gain reference value, $x_k$ is a vector of delayed raw data samples, and L is a delay term resulting from a pipelined architecture of the FIR filter circuit, selecting with a multiplexer the decision-directed filter coefficients set, and applying the decision-directed filter coefficients set to taps of the FIR filter circuit, thereby adapting the characteristics of the FIR filter circuit.

* * * * *